United States Patent
Lee et al.

(10) Patent No.: US 11,823,417 B2
(45) Date of Patent: Nov. 21, 2023

(54) CAMERA MODULE, IMAGE PROCESSING SYSTEM AND IMAGE COMPRESSION METHOD

(71) Applicant: SAMSUNG ELECTRONICS CO., LTD., Suwon-si (KR)

(72) Inventors: Wonseok Lee, Suwon-si (KR); Seongwon Jo, Suwon-si (KR); Yunseok Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 278 days.

(21) Appl. No.: 17/343,070

(22) Filed: Jun. 9, 2021

(65) Prior Publication Data

US 2022/0020179 A1      Jan. 20, 2022

(30) Foreign Application Priority Data

Jul. 16, 2020   (KR) .................. 10-2020-0088450
Jan. 5, 2021    (KR) .................. 10-2021-0001057

(51) Int. Cl.
| | | |
|---|---|---|
| G06K 9/00 | (2022.01) | |
| G06T 9/00 | (2006.01) | |
| H04N 19/154 | (2014.01) | |
| H04N 19/182 | (2014.01) | |
| H04N 19/119 | (2014.01) | |
| H04N 19/46 | (2014.01) | |
| H04N 19/105 | (2014.01) | |

(52) U.S. Cl.
CPC ............ *G06T 9/00* (2013.01); *H04N 19/105* (2014.11); *H04N 19/119* (2014.11); *H04N 19/154* (2014.11); *H04N 19/182* (2014.11); *H04N 19/46* (2014.11)

(58) Field of Classification Search
CPC ...... G06T 9/00; H04N 19/105; H04N 19/119; H04N 19/154; H04N 19/182; H04N 19/46; H04N 19/593; H04N 19/70; H04N 19/42; H04N 19/184
See application file for complete search history.

(56) References Cited

U.S. PATENT DOCUMENTS

| | | |
|---|---|---|
| 8,319,864 B2 | 11/2012 | Yamada |
| 9,635,289 B2 | 4/2017 | Kano |
| 9,918,028 B2* | 3/2018 | Higuchi .............. H04N 25/683 |
| 10,440,299 B2* | 10/2019 | Lin ..................... H04N 25/63 |
| 10,621,706 B2 | 4/2020 | Lee |
| 2008/0122925 A1 | 5/2008 | Sekimoto et al. |

(Continued)

FOREIGN PATENT DOCUMENTS

| | | |
|---|---|---|
| JP | 2008-141326 A | 6/2008 |
| JP | 2010-10800 A | 1/2010 |
| JP | 2011-24809 A | 2/2011 |

*Primary Examiner* — Shervin K Nakhjavan
(74) *Attorney, Agent, or Firm* — Sughrue Mion, PLLC

(57) ABSTRACT

An image compression camera module, an image processing system, and a method of compressing each of a plurality of pixel groups forming image data are provided. The method includes detecting a bad pixel among a plurality of pixels in a pixel group, generating a flag indicating position information about the bad pixel, calculating a first difference between a pixel value of a pixel among the plurality of pixels excluding the bad pixel and a reference pixel value, and generating a bitstream including the flag and the first difference.

20 Claims, 19 Drawing Sheets

(56) References Cited

U.S. PATENT DOCUMENTS

| | | | |
|---|---|---|---|
| 2011/0032393 A1* | 2/2011 | Yamaguchi | H04N 25/683 348/E9.037 |
| 2014/0016005 A1* | 1/2014 | Kishima | H04N 25/63 348/246 |
| 2017/0078599 A1* | 3/2017 | Higuchi | H04N 25/674 |
| 2019/0238751 A1 | 8/2019 | Heo et al. | |
| 2019/0373189 A1* | 12/2019 | Lee | H04N 19/186 |
| 2020/0021762 A1* | 1/2020 | Michihata | H04N 25/68 |
| 2021/0337143 A1* | 10/2021 | Lin | H04N 25/58 |

* cited by examiner

FIG. 12A

| MIPI MODE NAME | MODE NUMBER | HEADER | | | |
|---|---|---|---|---|---|
| PD MODE | MODE0 | 0 | 0 | 0 | 0 |
| | MODE1 | 0 | 0 | 0 | 1 |
| | MODE2 | 0 | 0 | 1 | 0 |
| | MODE3 | 0 | 0 | 1 | 1 |
| | MODE12 | 1 | 1 | 0 | 0 |
| | MODE13 | 1 | 1 | 0 | 1 |
| DGD MODE | MODE4 | 0 | 1 | 0 | 0 |
| | MODE5 | 0 | 1 | 0 | 1 |
| | MODE8 | 1 | 0 | 0 | 0 |
| | MODE9 | 1 | 0 | 0 | 1 |
| | MODE10 | 1 | 0 | 1 | 0 |
| | MODE11 | 1 | 0 | 1 | 1 |
| eSHV MODE | MODE14 | 1 | 1 | 1 | 0 |
| | MODE15 | 1 | 1 | 1 | 1 |
| OUT MODE | MODE7 | 0 | 1 | 1 | 1 |
| FNR MODE | MODE6 | 0 | 1 | 1 | 0 |

FIG. 12B

| MIPI MODE NAME | MODE NUMBER | HEADER | | | |
|---|---|---|---|---|---|
| AD MODE | MODE0 | 0 | 0 | 0 | 0 |
| | MODE1 | 0 | 0 | 0 | 1 |
| | MODE2 | 0 | 0 | 1 | 0 |
| | MODE3 | 0 | 0 | 1 | 1 |
| eHVD MODE | MODE12 | 1 | 1 | 0 | 0 |
| | MODE13 | 1 | 1 | 0 | 1 |
| OD MODE | MODE4 | 0 | 1 | 0 | 0 |
| | MODE5 | 0 | 1 | 0 | 1 |
| eMPD MODE | MODE8 | 1 | 0 | 0 | 0 |
| | MODE9 | 1 | 0 | 0 | 1 |
| | MODE10 | 1 | 0 | 1 | 0 |
| | MODE11 | 1 | 0 | 1 | 1 |
| eHVA MODE | MODE14 | 1 | 1 | 1 | 0 |
| (e)OUT MODE | MODE15 | 1 | 1 | 1 | 1 |
| | MODE7 | 0 | 1 | 1 | 1 |
| FNR MODE | MODE6 | 0 | 1 | 1 | 0 |

CAMERA MODULE, IMAGE PROCESSING SYSTEM AND IMAGE COMPRESSION METHOD

CROSS-REFERENCE TO RELATED APPLICATION(S)

This application is based on and claims priority under 35 U.S.C. § 119 to Korean Patent Application Nos. 10-2020-0088450 and 10-2021-0001057, filed on Jul. 16, 2020 and Jan. 5, 2021, in the Korean Intellectual Property Office, the disclosures of which are incorporated by reference herein in their entirety.

BACKGROUND

The disclosure relates to a camera module, an image processing system, and an image compression method, and more particularly, to a camera module that compresses image data according to detection of bad pixels.

Recently, as the demand for high-quality and high-definition photos, images, and the like has increased, the size of pixels in image sensors has decreased, and a larger number of pixels have been integrated. However, due to certain circumstances such as a manufacturing process issue, pixels of an image sensor may include one or more bad pixels in an arbitrary shape at an arbitrary position. Because the bad pixels in the arbitrary shape are not used to generate photos, images, or the like, the performance of the image sensor may deteriorate. Therefore, there is a need for correcting image data output from the bad pixels.

SUMMARY

One or more embodiments provide a camera module that compresses image data according to a detection of bad pixels, and an image processing system and an image compression method thereof.

According to an embodiment, there is provided an image compression method of compressing each of a plurality of pixel groups forming image data. The method includes: detecting a bad pixel among a plurality of pixels in a pixel group; generating a flag indicating position information about the bad pixel; calculating a first difference between a pixel value of a pixel among the plurality of pixels excluding the bad pixel and a reference pixel value; and generating a bitstream including the flag and the first difference.

According to an embodiment, there is provided a camera module including: an image sensor configured to generate image data including a plurality of pixels; an encoder configured to divide the plurality of pixels into a plurality of pixel groups, and sequentially compress the plurality of pixel groups to generate compressed data including a plurality of bitstreams; and a memory storing reference information including pixel values of pixels compressed by the encoder, wherein the encoder is further configured to: detect a bad pixel in a first pixel group; generate a first bitstream corresponding to the first pixel group by compressing first pixel values of a plurality of first pixels in the first pixel group based on a result of detecting the bad pixel and the reference information; and update the reference information based on a corrected pixel value obtained by correcting a pixel value of the bad pixel.

According to an embodiment, there is provided an image processing system including: an image sensor configured to generate image data including a plurality of pixels; an encoder configured to generate a plurality of bitstreams by sequentially compressing a plurality of pixel groups in the image data; and a decoder configured to restore the image data by decompressing the plurality of bitstreams, wherein the encoder is further configured to: detect a bad pixel in each of the plurality of pixel groups; compress pixel values of a second pixel group among the plurality of pixel groups according to reference information, the reference information being generated based on pixel values of a first pixel group among the plurality of pixel groups that is compressed prior to the second pixel group; and update the reference information based on a result of detecting the bad pixel.

BRIEF DESCRIPTION OF DRAWINGS

Embodiments of the inventive concept will be more clearly understood from the following detailed description taken in conjunction with the accompanying drawings in which:

FIGS. 12A and 12B are tables illustrating compression information according to embodiments;

DETAILED DESCRIPTION

Hereinafter, embodiments will be described in detail with reference to the accompanying drawings.

Figure 1:
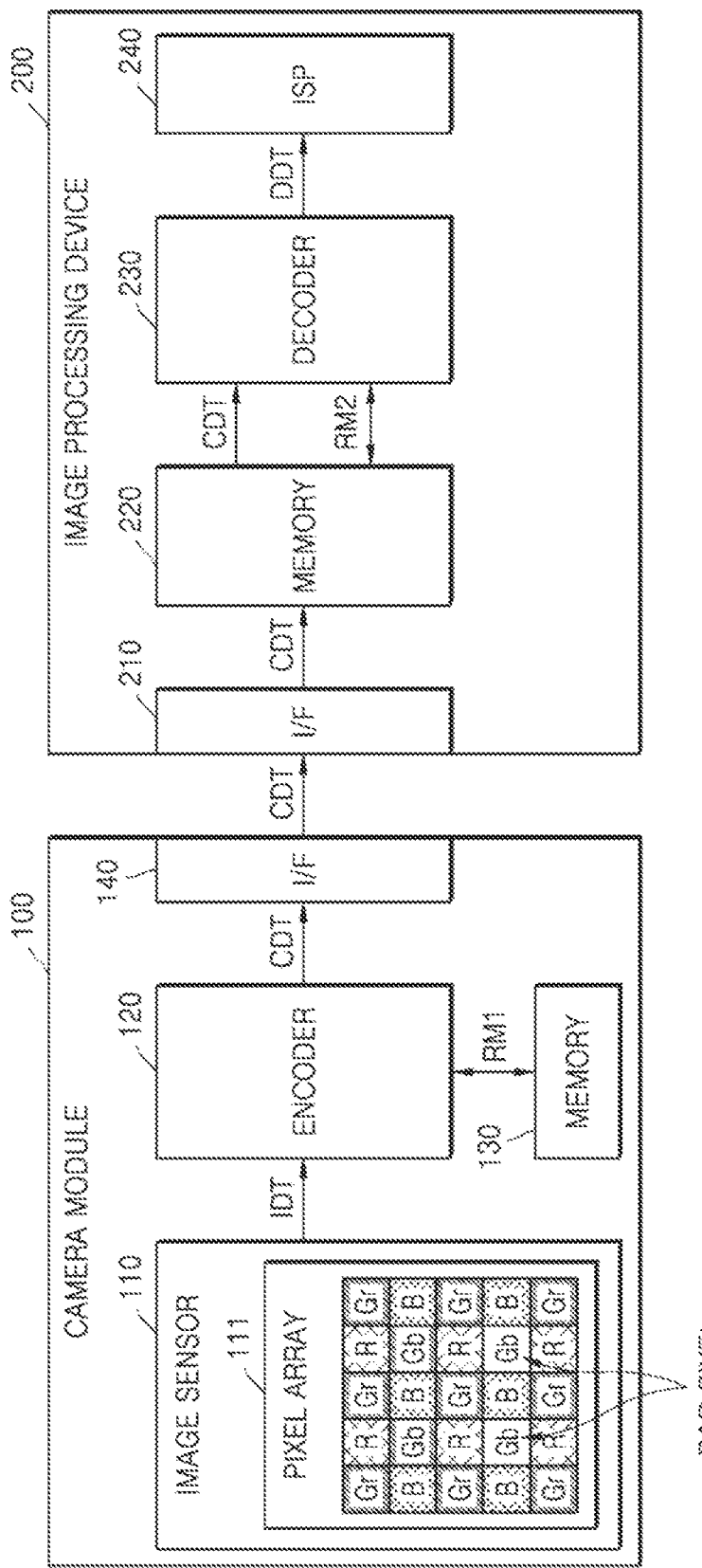
FIG. 1 is a diagram illustrating an image processing system according to an embodiment.

FIG. 1 is a diagram illustrating an image processing system 10 according to an embodiment. Referring to FIG. 1, the image processing system 10 may include a camera module 100 and an image processing device 200. The camera module 100 may include an image sensor 110, an encoder 120, a memory 130, and an interface (I/F) 140. The image processing device 200 may include an interface 210, a memory 220, a decoder 230, and an image signal processor (ISP) 240. However, the one or more embodiments are not limited thereto, and the camera module and the image processing device may include more or less components or parts.

The image processing system 10 may be implemented as a personal computer (PC), an Internet of Things (IoT) device, or a portable electronic device. The portable electronic device may be a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, etc. In addition, the image processing system 10 may be mounted on an electronic device such as a drone, an advanced driver assistance system (ADAS), etc., or an electronic device provided as parts for a vehicle, furniture, manufacturing facilities, doors, various measuring devices, etc.

The camera module 100 may photograph an object and generate image data IDT. In some embodiments, the camera module 100 may include the image sensor 110 for converting an optical signal of an object into an electrical signal. For example, the image sensor 110 may include a plurality of pixels arranged two-dimensionally and may include a pixel array 111. One of a plurality of reference colors may be assigned to each of the plurality of pixels. For example, the plurality of reference colors may include red, green, and blue (RGB) or red, green, blue, and white (RGBW). A reference color may also include colors other than those listed above. For example, the plurality of reference colors may include cyan, yellow, green, and magenta. The pixel array 111 may generate pixel signals including information about a reference color of each of a plurality of pixels.

The pixel array 111 may include a plurality of row lines, a plurality of column lines, a plurality of pixels respectively connected to the row lines and the column lines and arranged in a matrix form. A plurality of color filters may be arranged to respectively correspond to the plurality of pixels. For example, referring to FIG. 1, each of the plurality of color filters may have a cell having a size of 2×2, including a red pixel R, a blue pixel B, and two green pixels Gr and Gb that are repeatedly arranged. Such a pattern may be referred to as a Bayer pattern.

As another example, the color filter may have a configuration in which pixel groups respectively corresponding to the plurality of reference colors are repeatedly arranged. For example, the color filter may have a configuration in which a red pixel group including red pixels R arranged 2×2, a first green pixel group including first green pixels Gr arranged 2×2, a blue pixel group including blue pixels B arranged 2×2, and a second green pixel group including green pixels Gb arranged 2×2 are repeatedly arranged. Such a pattern may be referred to as a tetra pattern or tetracell.

As another example, the color filter may have a configuration in which a red pixel group including the red pixels R arranged 3×3, a first green pixel group including the first green pixels Gr arranged 3×3, a blue pixel group including the blue pixels B arranged 3×3, and a second green pixel group including the green pixels Gb arranged 3×3 are repeatedly arranged. Such a pattern may be referred to as a nona pattern or nonacell.

The one or more embodiments are not limited thereto, and the color filter may also have a configuration in which a red pixel group, a blue pixel group, a first green pixel group, and a second green pixel group including pixels arranged 2n×2n or 3n×3n (where, n is a positive integer) are repeatedly arranged.

In a non-limiting example embodiment, the image sensor 110 may be implemented using a charge-coupled device (CCD) image sensor or a complementary metal-oxide-semiconductor (CMOS) image sensor, and may be implemented as various types of photoelectric devices. The image sensor 110 may output image data IDT in which pre-processing has been performed on a pixel signal generated by the pixel array 111.

Although it has been described that the image data IDT includes information about the reference color (e.g., RGB information), the one or more embodiments are is not limited thereto. For example, the image sensor 110 may convert the RGB information of each pixel into YUV information including information about luminance and color difference through color space conversion. Accordingly, the image data IDT may include the YUV information corresponding to each pixel. Even when the image data IDT includes the YUV information, the inventive concept may be substantially equally applied.

The camera module 100 may compress the image data IDT by using the encoder 120 to reduce power consumption in data transmission and to increase the efficiency of a data storage space. In particular, the encoder 120 may receive the image data IDT from the image sensor 110 and generate compressed data CDT by compressing the image data IDT. The compressed data CDT may be output in a form of an encoded bitstream. Hereinafter, the encoded bitstream is simply referred to as a bitstream.

The encoder 120 may compress the image data IDT in units of pixel groups. Here, the pixel groups may be set to include a preset number of pixels sequentially arranged according to a pattern of the image data IDT, or may be set to include pixels corresponding to the same reference color and being adjacent to each other. For example, when the image data IDT is in a Bayer pattern, the pixel groups may be set to include a preset number (for example, four) of pixels sequentially arranged horizontally and vertically. As another example, when the image data IDT is in a tetra pattern or a nona pattern, the pixel groups may be set to include four or nine pixels corresponding to the same reference color (e.g., red, blue, green, or the like) and being adjacent to each other. The encoder 120 may generate one bitstream by compressing one pixel group, and may generate the compressed data CDT based on bitstreams of all pixel groups in the image data IDT.

The encoder 120 may compress a particular pixel group using a first reference map RM1 generated based on pixel values corresponding to pixels that are compressed prior to the corresponding pixel group. For example, the encoder 120 may determine a reference value based on pixel values of at least one pixel adjacent to a target pixel to be compressed in the pixel group in the first reference map RM1 and compress a pixel value of the target pixel based on the reference value and the pixel value of the target pixel.

When the pixel group is compressed, the encoder 120 may generate (or update) a new first reference map RM1 by adding pixel values of the compressed pixel group to the existing first reference map RM1. Also, the encoder 120 may compress a pixel group in a next order by using the new first reference map RM1.

It is highly possible that the pixel value of the target pixel and the pixel value of the adjacent pixel have similar values to each other. Accordingly, when the compressed data CDT is generated by compressing the image data IDT in the above-described method, compression efficiency may be increased and data loss may be reduced. Hereinafter, for convenience of explanation, information including pixel values corresponding to pixels which has been compressed prior to a pixel group to be compressed is referred to as the first reference map RM1, and the inventive concept is not limited thereto. The first reference map RM1 may also be referred to as other names, such as reference information.

The image data IDT may include a pixel value of a bad pixel. Herein, the bad pixel may include a static bad pixel that is continuously turned on or turned off, and a dynamic bad pixel that is randomly turned on or turned off. Because the position of the static bad pixel is fixed, a pixel value of the static bad pixel may be corrected through a pre-processing operation of the image sensor 110 which is capable of simple operation processing. As the position of the dynamic bad pixel is not fixed, more than a simple operation may be required for the correction. Therefore, it is more difficult to correct a pixel value of a dynamic bad pixel through the pre-processing operation of the image sensor 110.

Because the encoder 120 is configured to compress the image data IDT rather than to correct the image data IDT, the encoder 120 may compress the image data IDT even when a bad pixel is included in the image data IDT. Accordingly, when the encoder 120 performs compression in the above-described method, the first reference map RM1 may include a pixel value of a bad pixel. Because the pixel value of the bad pixel has a large difference from pixel values of neighboring pixels, compression efficiency may be decreased and data loss may occur during compression using the first reference map RM1.

In order to improve compression efficiency and to prevent data loss, the encoder 120 may detect a bad pixel among the plurality of pixels included in the first reference map RM1. When a bad pixel is included in the first reference map RM1, a reference value may be determined based on pixel values of pixels (e.g., normal pixels) excluding pixel values of the bad pixel. Because the above-described detection operation requires a large amount of operations when detecting one or more bad pixels for each of compression operations of all pixels, power consumption may be increased.

According to an embodiment, the encoder 120 may correct a pixel value of a bad pixel (particularly, a dynamic bad pixel) and include the corrected pixel value to the first reference map RM1 in a method of performing compression in the above-described method. Accordingly, when a pixel value of the bad pixel is not included in the first reference map RM1, a bad pixel detection operation for the first reference map RM1 may be omitted.

The memory 130 may be configured to store, for example, the image data IDT or the first reference map RM1. The memory 130 may be a volatile memory such as dynamic random access memory (DRAM) or static random access memory (SRAM), or a non-volatile memory such as phase change random access memory (PRAM), resistive random access memory (ReRAM), or flash memory.

The encoder 120 may provide the generated compressed data CDT to the image processing device 200 through the interface 140. For example, the interface 140 may be implemented as a camera serial interface (CSI) based on a Mobile Industry Processor Interface (MIPI). However, the type of the interface 140 is not limited thereto, and may be implemented according to various protocol standards.

The image processing device 200 may convert the compressed data CDT received from the camera module 100 to generate an image to be displayed on a display. In particular, the image processing device 200 may receive the compressed data CDT from the camera module 100, generate decompressed data DDT by decompressing the compressed data CDT, and generate a final image by performing an image processing operation based on the decompressed data DDT.

In some embodiments, the image processing device 200 may receive the compressed data CDT from the camera module 100 through the interface 210. The interface 210 may be implemented as an MIPI, like the interface 140, but is not limited thereto. The image processing device 200 may store the received compressed data CDT in the memory 220.

The memory 220 may be configured to store, for example, an operating system (OS), various programs, and various data (e.g., the compressed data CDT). The memory 220 may be a volatile memory such as DRAM or SRAM, or a non-volatile memory such as PRAM, ReRAM, or flash memory.

The decoder 230 may read the compressed data CDT from the memory 220 and decompress the compressed data CDT to generate the decompressed data DDT. The decoder 230 may output the decompressed data DDT to the ISP 240.

In some embodiments, the decoder 230 may decompress the compressed data CDT in units of pixel groups. Here, the decoder 230 may decompress a pixel group by using a second reference map RM2 generated based on pixel values corresponding to pixels that are decompressed prior to the corresponding pixel group.

According to an embodiment, the second reference map RM2 may include a corrected pixel value of a bad pixel (particularly, a dynamic bad pixel), like the first reference map RM1 described above. That is, when a bad pixel exists in a decompressed pixel group, the decoder 230 may correct a pixel value of the bad pixel and generate a new second reference map RM2 including the corrected pixel value. In other words, the decoder 230 may update the second reference map RM2 with the corrected pixel value of the bad pixel. Also, the decoder 230 may decompress a pixel group in a next order based on the new second reference map RM2. The second reference map RM2 may be stored in the memory 220. Hereinafter, for convenience of explanation, information including pixel values corresponding to pixels which has been decompressed prior to a pixel group to be decompressed is referred to as the second reference map RM2, but the one or more embodiments are not limited thereto.

Each of the encoder 120 and the decoder 230 may be implemented as software or hardware, or a combination of software and hardware such as firmware. When the encoder 120 and the decoder 230 are implemented as software, each of the above-described functions may be implemented as programmed source code and may be loaded into a storage medium included in each of the camera module 100 and the image processing device 200. A processor (e.g., a microprocessor) included in each of the camera module 100 and the image processing device 200 may execute the software, and thus, thus the functions of the encoder 120 and the decoder 230 may be implemented. When the encoder 120 and the decoder 230 are implemented as hardware, the encoder 120 and the decoder 230 may include a logic circuit and a register, and may perform the functions described above based on register setting.

The ISP 240 may perform various image processing operations on the received decompressed data DDT. In a non-limiting example, the ISP 240 may perform at least one image processing operation of bad pixel correction, offset correction, lens distortion correction, color gain correction, shading correction, gamma correction, denoising, and sharpening, on the decompressed data DDT. In some embodiments, according to the performance of the camera module 100, some of the image processing operations described above may be omitted. For example, when the camera module 100 includes the image sensor 110 of high quality, bad pixel correction (particularly, static bad pixel correction) or offset correction among the image processing operations may be omitted.

In FIG. 1, the image processing system 10 is illustrated as including the camera module 100 and the image processing device 200, but the inventive concept is not limited thereto. For example, the image processing system 10 may include only some of the camera module 100 and the image processing device 200, or include a plurality of camera modules 100. In addition, although FIG. 1 illustrates that the decoder 230 and the ISP 240 are separate elements, the inventive concept is not limited thereto. For example, the ISP 240 may be combined with the decoder 230 as one element.

In addition, although the memory 130 and the memory 220 are illustrated as being included in the camera module 100 and the image processing device 200, respectively, in FIG. 1, the inventive concept is not limited thereto. For example, each of the memory 130 and the memory 220 may be positioned outside the camera module 100 or the image processing device 200.

The image processing system 10 of the inventive concept may drastically reduce the number of bad pixel detection operations by generating reference maps for compression and decompression according to a detection of bad pixels and compressing image data or decompressing the compressed data based on the generated reference maps. Accordingly, the power consumption of the image processing system may be reduced.

Figure 2:
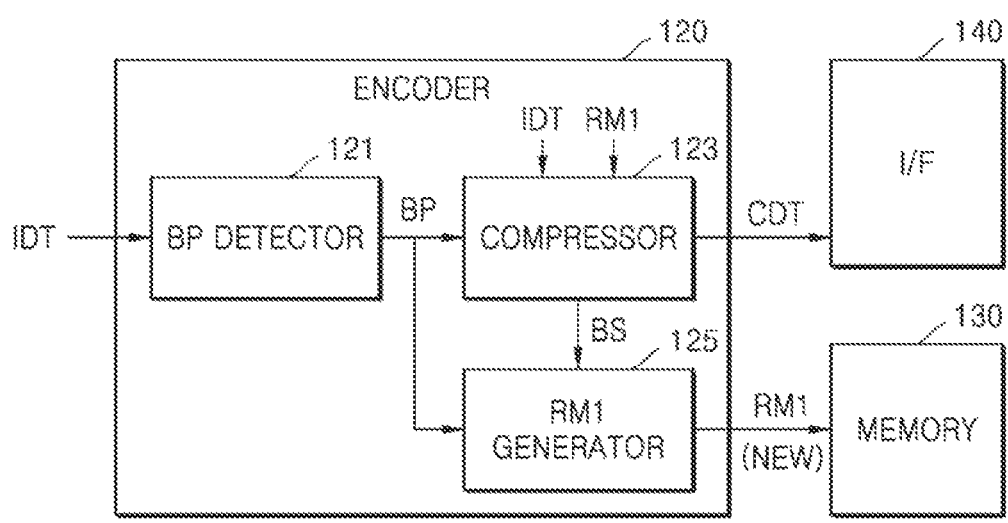
FIG. 2 is a diagram illustrating an encoder according to an embodiment.

FIG. 2 is a diagram illustrating the encoder 120 according to an embodiment. Referring to FIGS. 1 and 2, the encoder 120 may include a bad pixel (BP) detector 121, a compressor 123, and a first reference map (RM1) generator 125.

The bad pixel detector 121 may receive the image data IDT from the image sensor 110. The bad pixel detector 121 may perform bad pixel detection on a pixel group to be compressed based on the received image data IDT. This will be described below in detail with reference to FIGS. 3 and 4. The bad pixel detector 121 may transmit bad pixel information BP including a detection result to the compressor 123 and/or the first reference map generator 125.

The compressor 123 may generate the compressed data CDT by compressing the image data IDT by using the bad pixel information BP and the first reference map RM1. In particular, the compressor 123 may check a bad pixel in the pixel group to be compressed of the image data IDT based on the bad pixel information BP received from the bad pixel detector 121. Also, the compressor 123 may compress pixel values of pixels (e.g., normal pixels) excluding pixel values of the bad pixel in the pixel group by using the first reference map RM1.

For example, the compressor 123 may determine a reference value based on a pixel value of at least one pixel adjacent to a target pixel in a pixel group or a normal pixel in the first reference map RM1. Also, the compressor 123 may generate a bitstream BS corresponding to the pixel group by compressing the pixel group based on the reference value and a pixel value of the normal pixel instead of the bad pixel. This will be described below in detail with reference to FIGS. 3 and 4.

The compressor 123 may generate bitstreams BS corresponding to pixel groups by repeating the above-described operation for each of pixel groups of the image data IDT. Also, the compressor 123 may generate the compressed data CDT based on the bitstreams BS.

The compressor 123 may transmit the generated compressed data CDT to the interface 140. The interface (I/F) 140 may transmit the compressed data CDT to the image processing device 200. In addition, the compressor 123 may transmit the bitstream BS to the first reference map generator 125 based on each bitstream BS being generated.

The first reference map generator 125 may generate a new first reference map RM1(NEW) based on the received bad pixel information BP and the bitstream BS. In particular, the first reference map generator 125 may restore pixel values of the pixel group by decoding the bitstream BS first. Also, the first reference map generator 125 may check a bad pixel in the pixel group based on the bad pixel information BP. In addition, the first reference map generator 125 may correct a pixel value of the bad pixel among the restored pixels to a value similar to pixel values of neighboring pixels. Also, the first reference map generator 125 may generate the new first reference map RM1(NEW) by adding restored pixel values of pixels excluding the value of the bad pixel in the pixel group and the corrected pixel value of the bad pixel to the existing first reference map RM1. This will be described below in detail with reference to FIGS. 3 and 4.

As described above, when one pixel group is compressed, the first reference map generator 125 may generate the new first reference map RM1(NEW) by adding a pixel value (e.g., restored pixel values corresponding to a compressed pixel group and/or a corrected pixel value of a bad pixel) to the existing first reference map RM1 for compression of a pixel group in a next order. The first reference map generator 125 may store the generated new first reference map RM1 (NEW) in the memory 130. The compressor 123 may read the new first reference map RM1(NEW) stored in the memory 130 and perform compression on a pixel group in a next order based on the read new first reference map RM1(NEW).

Each of the bad pixel detector 121, the compressor 123, and the first reference map generator 125 may be implemented as software or hardware, or a combination of software and hardware such as firmware. When the bad pixel detector 121, the compressor 123, and the first reference map generator 125 are implemented as software, each of the above-described functions may be implemented as programmed source code and may be loaded into a storage medium included in the camera module 100. A processor (e.g., a microprocessor) included in the camera module 100 may execute software, and thus functions of the bad pixel detector 121, the compressor 123, and the first reference map generator 125 may be implemented. When the bad pixel detector 121, the compressor 123, and the first reference map generator 125 are implemented as hardware, the bad pixel detector 121, the compressor 123, and the first reference map generator 125 may include a logic circuit and a register, and may perform the functions described above based on register setting.

Figure 3:
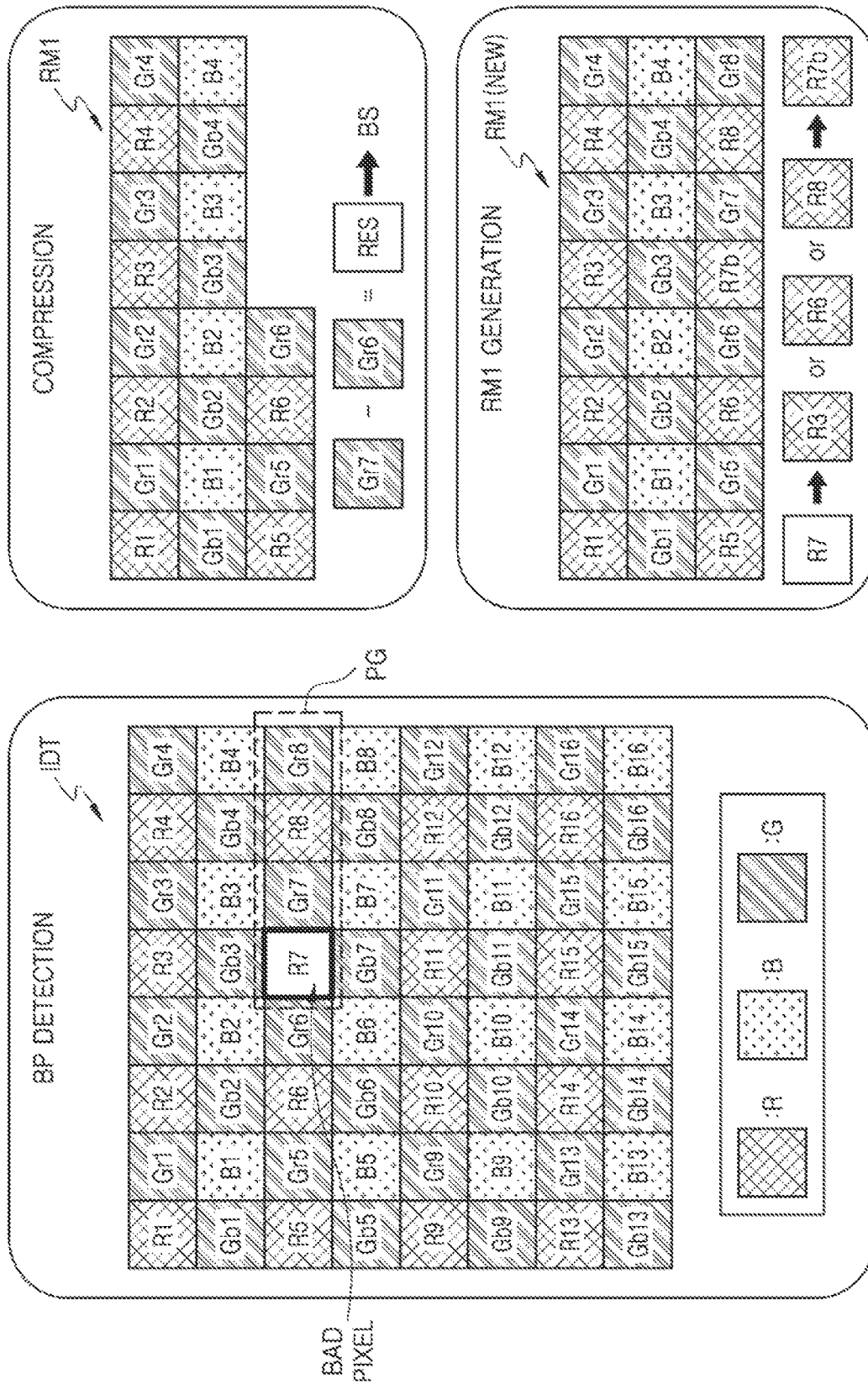
FIG. 3 is a conceptual diagram showing an image compression method according to an embodiment.

FIG. 3 is a conceptual diagram showing an image compression method according to an embodiment. Specifically, FIG. 3 is a diagram showing a method of compressing the image data IDT in a Bayer pattern by the encoder 120. Hereinafter, it is assumed that one pixel group is set to include four pixels which are sequentially arranged. In addition, an embodiment in which the encoder 120 compresses a pixel group PG including a pixel R7, which is a bad pixel, and pixels Gr7, R8, and Gr8, which are normal pixels, will be described. In addition, for convenience of explanation, a pixel, which is a target to be processed, among the pixels in the pixel group PG is referred to as a target pixel.

The bad pixel detector 121 may detect one or more bad pixels among the plurality of pixels in the pixel group PG. In particular, the bad pixel detector 121 may detect whether the target pixel is a bad pixel based on a pixel value of at least one first pixel adjacent to the target pixel in the image data IDT. In some embodiments, the bad pixel detector 121 may detect whether the target pixel is a bad pixel based on a pixel value of at least one first pixel corresponding to the same reference color as the target pixel and being adjacent to the target pixel. In this case, a standard for determining a pixel adjacent to the target pixel may be variously set. For example, a pixel in a direct contact with the target pixel or a pixel positioned within a certain distance from the target pixel may be determined to be a pixel adjacent to the target pixel.

In particular, when there are a plurality of first pixels, the bad pixel detector 121 may calculate an average pixel value of the plurality of first pixels and calculate a difference value between the average pixel value and a pixel value of the target pixel. When the calculated difference value exceeds a threshold value, the bad pixel detector 121 may detect the target pixel as a bad pixel. Herein, the threshold value may be preset by a user or a manufacturer, and may have a different value for each image data IDT. The bad pixel detector 121 may generate bad pixel information by repeating the above-described detection operation for each of the pixels in the pixel group PG. In addition, the bad pixel information may include position information of the bad pixel.

For example, referring to FIG. 3, the bad pixel detector 121 may calculate an average pixel value of a plurality of first pixels (e.g., R3, R6, R8, and R11) corresponding to the same red color as the pixel R7 and being adjacent to the pixel R7 in the image data IDT, where the pixel R7 is a target pixel. Also, the bad pixel detector 121 may calculate a difference value between the calculated average pixel value and a pixel value of the pixel R7. When the calculated difference value exceeds a threshold value, the bad pixel detector 121 may determine the pixel R7 as a bad pixel.

The bad pixel detection operation of the bad pixel detector 121 is not limited to the above-described example, and various methods may be applied. For example, the bad pixel detector 121 may detect whether a target pixel is a bad pixel based on, regardless of a reference color, a pixel value of at least one first pixel which is adjacent to the target pixel.

For example, referring to FIG. 3, the bad pixel detector 121 may detect whether the pixel R7 is a bad pixel based on pixel values of the plurality of first pixels (e.g., R6, Gr6, Gr7, and R8) which are adjacent to the pixel R7 in a horizontal direction in the image data IDT. As another example, the bad pixel detector 121 may detect whether the pixel R7 is a bad pixel based on pixel values of the plurality of first pixels (e.g., R3, Gb3, Gb7, and R11) which are adjacent to the pixel R7 in a vertical direction. As another example, the bad pixel detector 121 may detect whether the pixel R7 is a bad pixel based on pixel values of other pixels (e.g., Gr7, R8, and Gr8) included in the pixel group PG including the pixel R7.

The compressor 123 may identify a bad pixel in a pixel group based on the bad pixel information received from the bad pixel detector 121, and may compress pixel values of pixels other than the bad pixel.

In particular, the compressor 123 may identify, in the first reference map RM1, at least one second pixel that is not a bad pixel, corresponding to the same reference color as the target pixel and being adjacent to the target pixel (or the pixel group PG). Also, the compressor 123 may determine a reference value based on a pixel value of the identified at least one second pixel. In addition, the compressor 123 may compress a pixel value of the bad pixel based on the reference value and the pixel value of the bad pixel. In this case, a standard for determining a second pixel adjacent to the target pixel may be variously set.

In some embodiments, when there are a plurality of second pixels, the compressor 123 may determine a pixel value of a pixel at a particular position (e.g., on the left, upper, or diagonal side of the target pixel) among the plurality of second pixels as a reference value. Alternatively, the compressor 123 may calculate an average pixel value of the plurality of second pixels which are identified, and may determine the calculated average pixel value as a reference value. Also, the compressor 123 may calculate a difference value RES between the reference value and the pixel value of the target pixel.

The compressor 123 may calculate a plurality of difference values RES by repeating the above-described operation on all pixels in the pixel group PG, and may generate a bitstream BS including the plurality of difference values RES. As described above, the compression method performed based on the difference value RES may be referred to as a Differential Pulse Code Modulation (DPCM).

For example, referring to FIG. 3, the compressor 123 may identify, in the first reference map RM1, the plurality of second pixels (e.g., Gb3, Gb4, Gb7, Gb8, Gr3, Gr6, and Gr8) corresponding to the same reference color as a pixel Gr7 and being adjacent to the pixel Gr7, where the pixel Gr7 is a target pixel. Also, the compressor 123 may determine a pixel value of a pixel (e.g., Gr6) positioned on the left side of the pixel Gr7 among the plurality of second pixels (e.g., Gb3, Gb4, Gb7, Gb8, Gr3, Gr6, and Gr8), as a reference value. In addition, the compressor 123 may calculate the difference value RES between the reference value and a pixel value of the pixel Gr7, and may generate the bitstream BS including the calculated difference value RES.

When the pixel group PG is compressed, the first reference map generator 125 may generate a new first reference map RM1(NEW) by adding pixel values corresponding to the compressed pixel group PG to the existing first reference map RM1. For example, the first reference map generator 125 may restore the pixel values of the pixel group PG by decoding the bitstream BS of the pixel group PG received from the compressor 123 and may generate the new first reference map RM1(NEW) by adding the restored pixel values to the existing first reference map RM1. A method of restoring pixel values based on the bitstream BS performed by the first reference map generator 125 may be substantially the same as a decompression method of the decoder 230 to be described below. As another example, the first reference map generator 125 may also add pixel values corresponding to the pixel group PG in the image data IDT to the existing first reference map RM1.

According to the inventive concept, when a bad pixel is included in the pixel group PG, the first reference map generator 125 may correct a pixel value of the bad pixel and then add the corrected pixel value of the bad pixel to the existing first reference map RM1, thereby generating the new first reference map RM1(NEW).

In some embodiments, the first reference map generator 125 may correct the pixel value of the bad pixel in various methods based on pixel values of a plurality of third pixels which are adjacent to the bad pixel. In particular, the first reference map generator 125 may identify the plurality of third pixels which correspond to the same reference color as the bad pixel and are adjacent to the bad pixel. Also, the first reference map generator 125 may correct the pixel value of the bad pixel based on pixel values of the plurality of third pixels.

For example, referring to FIG. 3, the first reference map generator 125 may correct the pixel value of the pixel R7 as a pixel value of a third pixel (e.g., R3) corresponding to the same red color as the pixel R7 and positioned on the upper side of the pixel R7, where the pixel R7 is a bad pixel. As another example, the first reference map generator 125 may correct the pixel value of the pixel R7 as a pixel value of a third pixel (e.g., R6) positioned on the left side of the pixel R7. As another example, the first reference map generator 125 may correct the pixel value of the pixel R7 as a pixel value of a third pixel (e.g., R8) positioned on the right side of the pixel R7. As another example, the first reference map generator 125 may correct the pixel value of the pixel R7 as an average pixel value of the plurality of third pixels (e.g., R2 and R4) positioned diagonally to the pixel R7.

Also, the first reference map generator 125 may add a corrected pixel value R7b of the pixel R7 to the existing first reference map RM1, wherein the pixel value of the pixel R7 is corrected to the corrected pixel value R7b based on any one of the above-described methods. In addition, the first reference map generator 125 may also add the pixel values of the pixels Gr7, R8, and Gr8, which are normal pixels among the pixels in the pixel group PG, to the existing first reference map RM1 to generate the new first reference map RM1(NEW).

Figure 4:
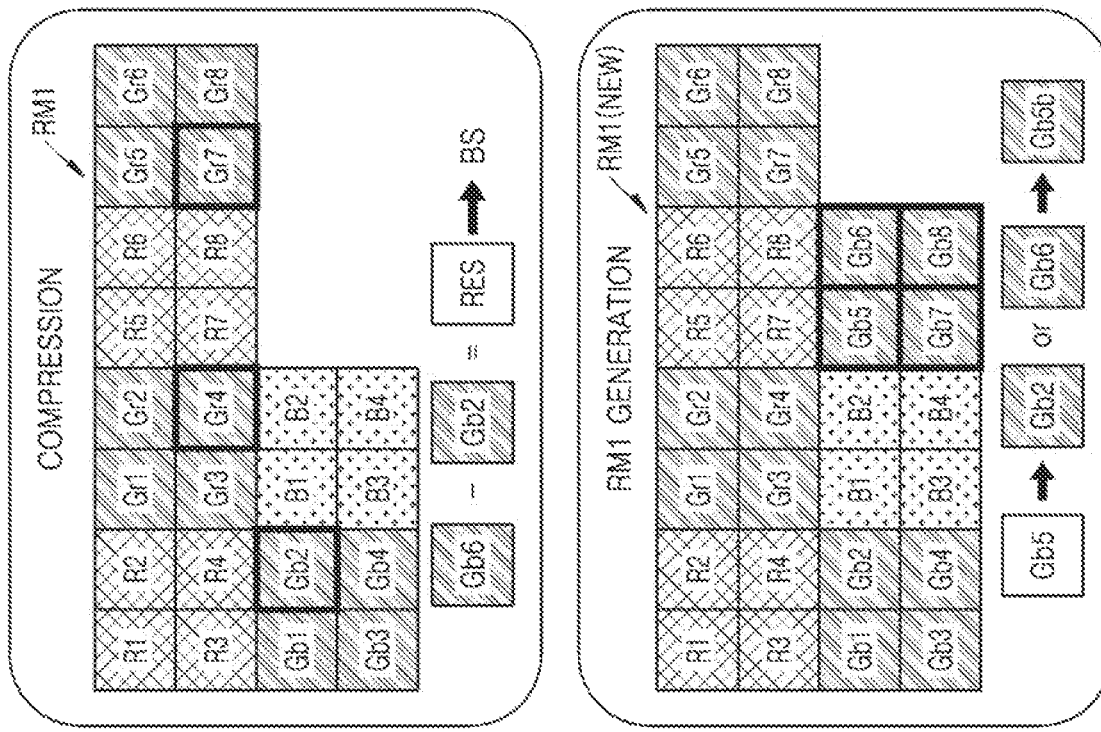
FIG. 4 is a conceptual diagram showing an image compression method according to an embodiment.
Figure 4:
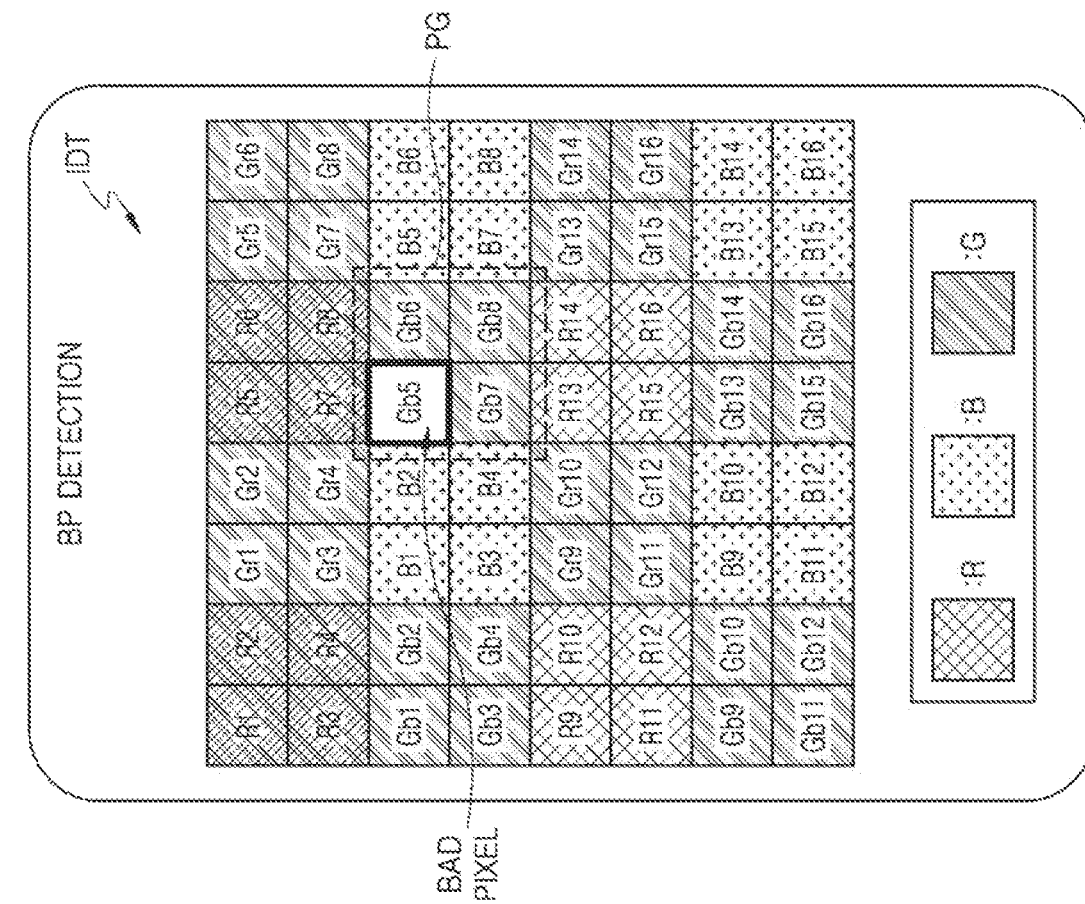

FIG. 4 is a conceptual diagram showing an image compression method according to an embodiment. Specifically, FIG. 4 is a diagram showing a method of compressing the image data IDT in a tetra pattern performed by the encoder 120. Hereinafter, it is assumed that one pixel group is set to include pixels corresponding to the same reference color and being adjacent to each other. For example, a pixel group PG including pixels Gb5, Gb6, Gb7, and Gb8 has the same reference color green. In this pixel group PG, the pixel Gb5 may be a bad pixel, and the pixels Gb6, Gb7 and Gb8 may be normal pixels. Description of FIG. 4 overlapping with the description provided above with reference to FIG. 3 will be omitted.

The bad pixel detector 121 may detect whether a target pixel is a bad pixel based on a pixel value of at least one first pixel adjacent to the target pixel in the image data IDT. In some embodiments, the bad pixel detector 121 may detect whether a target pixel is a bad pixel based on a pixel value of at least one first pixel corresponding to the same reference color as the target pixel and being adjacent to the target pixel.

For example, referring to FIG. 4, the bad pixel detector 121 may calculate an average pixel value of a plurality of first pixels (e.g., Gb6, Gb7, and Gb8) corresponding to the same green color as the pixel Gr5 and being adjacent to the pixel Gr5 in the image data IDT, where the pixel Gr5 is a target pixel. Also, the bad pixel detector 121 may calculate a difference value between the calculated average pixel value and a pixel value of a target pixel. When the calculated difference value exceeds a threshold value, the bad pixel detector 121 may determine that the target pixel is a bad pixel. The bad pixel detection operation of the bad pixel detector 121 is not limited to the above-described example, and various methods may be applied.

The compressor 123 may identify a bad pixel in a pixel group based on the bad pixel information received from the bad pixel detector 121, and may compress pixel values of pixels other than the bad pixel.

In particular, the compressor 123 may identify, in the first reference map RM1, at least one second pixel, which is not a bad pixel, corresponding to the same reference color as the target pixel and being adjacent to the target pixel (or the pixel group PG). Also, the compressor 123 may determine a reference value based on a pixel value of the identified at least one second pixel. In addition, the compressor 123 may compress a pixel value of the bad pixel based on the reference value and the pixel value of the bad pixel.

In some embodiments, when there are a plurality of second pixels, the compressor 123 may determine a pixel value of a pixel at a particular position (e.g., on the left, upper, or diagonal side of the target pixel) among the plurality of second pixels as a reference value. Alternatively, the compressor 123 may calculate an average pixel value of a pixel group compressed prior to the pixel group PG which is currently being compressed, and determine the calculated average pixel value as a reference value. For example, assuming that a first pixel group PG1 is compressed prior to a second pixel group PG2, the compressor 123 may use an average pixel value calculated for the first pixel group PG1 as a reference value when compressing the second pixel group PG2. In addition, the compressor 123 may calculate a difference value RES between a reference value and a pixel value of a target pixel and generate a bitstream BS including the calculated difference value RES.

The compressor 123 may calculate a plurality of difference values RES by repeating the above-described operation on all pixels in the pixel group PG, and may generate a bitstream BS including the plurality of difference values RES.

For example, referring to FIG. 4, the compressor 123 may identify, in the first reference map RM1, the plurality of second pixels (e.g., Gb1, Gb2, Gb3, and Gb4) corresponding to the same reference color to a pixel Gb6 and being adjacent to the pixel Gb6, where the pixel Gb6 is not a bad pixel. Also, the compressor 123 may determine an average pixel value of the plurality of second pixels (e.g., Gb2, Gb4, and Gr7), as a reference value. In addition, the compressor 123 may calculate the difference value RES between the reference value and a pixel value of the pixel Gb6, and may generate a bitstream BS including the calculated difference value RES.

When the pixel group PG is compressed, the first reference map generator 125 may generate a new first reference map RM1(NEW) by adding pixel values corresponding to the compressed pixel group PG to the existing first reference map RM1. For example, the first reference map generator 125 may restore the pixel values of the pixel group PG by decoding the bitstream BS received from the compressor 123 and may generate the new first reference map RM1 (NEW) by adding the restored pixel values to the existing first reference map RM1.

That is, the first reference map generator 125 may correct a pixel value of a bad pixel in the pixel group PG and then add the corrected pixel value of the bad pixel to the existing first reference map RM1.

In some embodiments, the first reference map generator 125 may correct a pixel value of a bad pixel in various methods based on pixel values of a plurality of third pixels which are adjacent to the bad pixel. Specifically, the first reference map generator 125 may identify the plurality of third pixels corresponding to the same reference color as the bad pixel and are adjacent to the bad pixel. Also, the first reference map generator 125 may correct the pixel value of the bad pixel based on pixel values of the plurality of third pixels.

For example, referring to FIG. 4, the first reference map generator 125 may correct a pixel value of the pixel Gb5 as a pixel value of a third pixel (e.g., Gb2) corresponding to the same green color as the pixel Gb5 and positioned on the left side of the pixel Gb5, where the pixel Gb5 is a bad pixel. As another example, the first reference map generator 125 may correct the pixel value of the pixel Gb5 to a pixel value of a third pixel positioned on the upper side of the pixel Gb5. As another example, the first reference map generator 125 may correct the pixel value of the pixel Gb5 to a pixel value of a third pixel (e.g., Gb6) positioned on the right side of the pixel Gb5. As another example, the first reference map generator 125 may correct the pixel value of the pixel Gb5 to an average pixel value of pixels (e.g., Gr4 and Gr7) positioned diagonally to the pixel Gb5. As another example, the first reference map generator 125 may correct the pixel value of the pixel Gb5 to an average pixel value of other pixels (e.g., Gb6, Gb7, and Gb8), not including bad pixels in the pixel group PG.

Also, the first reference map generator 125 may add a corrected pixel value Gb5b of the target pixel Gb5 to the existing first reference map RM1, where the pixel value of the pixel Gb5 is corrected to the corrected pixel value Gb5b based on any one of the above-described method. In addition, the first reference map generator 125 may also add pixel values of the pixels Gb6, Gb7, and Gb8, which are normal pixels among the plurality of pixels in the pixel group PG, to the existing first reference map RM1 to generate the new first reference map RM1(NEW).

Although a description has been made with reference to FIG. 4, assuming that the image data IDT is in a tetra pattern, the inventive concept is not limited thereto. For example, the above-described method may be applied even when the image data IDT is in a nona pattern.

Figure 5A:
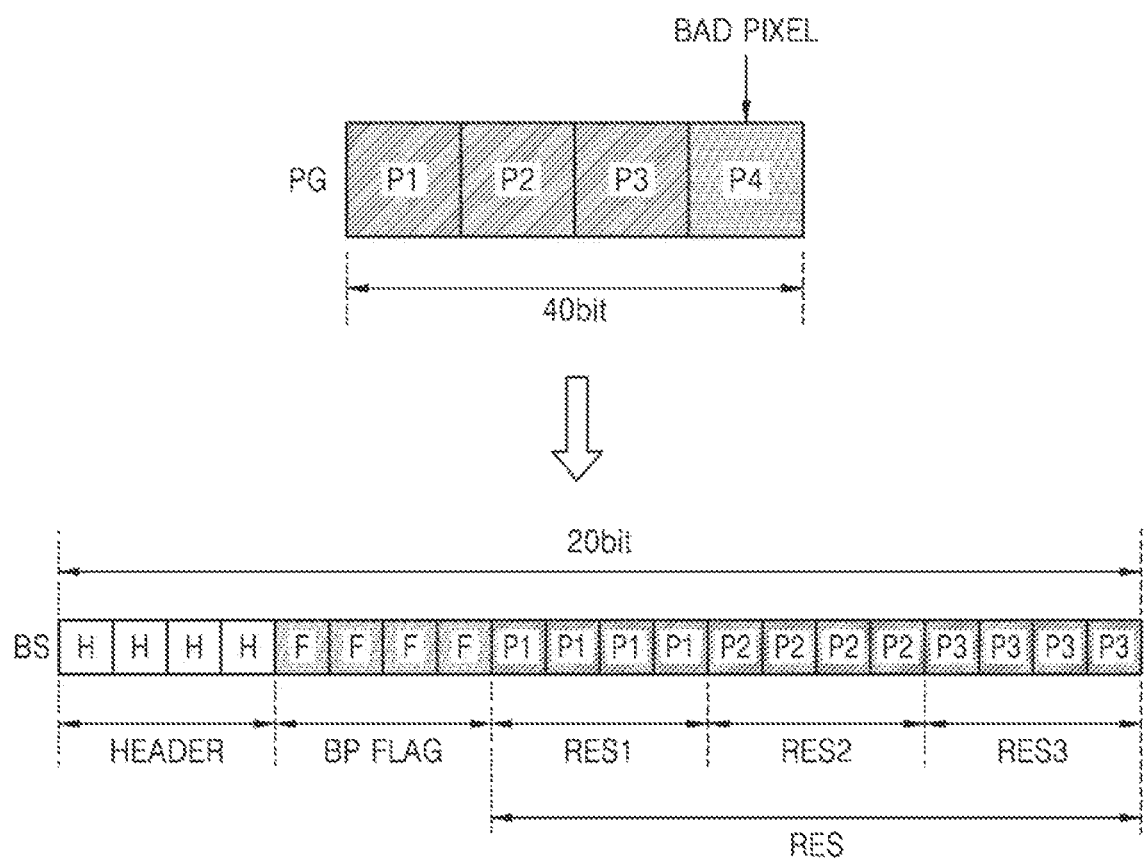
FIGS. 5A and 5B are diagrams illustrating bitstreams according to embodiments.
Figure 5B:
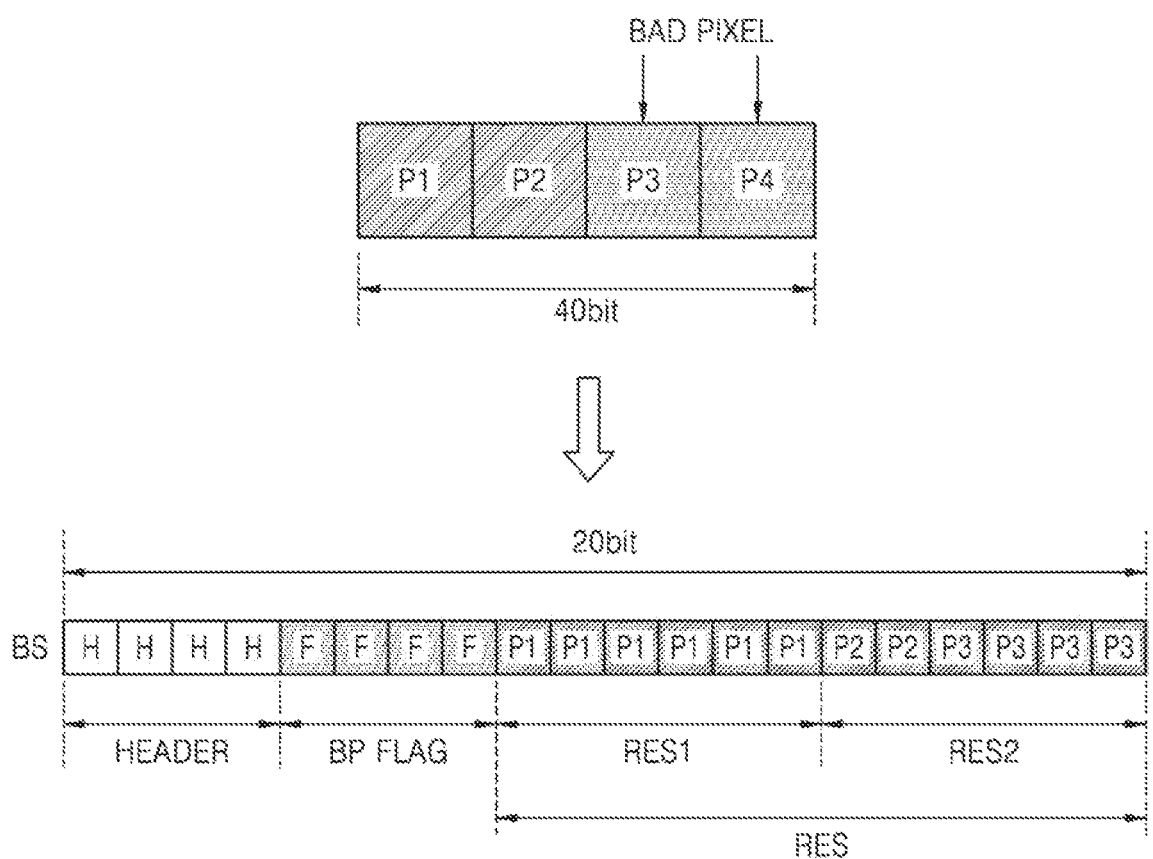

FIGS. 5A and 5B are diagrams illustrating encoded bitstreams according to embodiments. Specifically, FIGS. 5A and 5B are diagrams each illustrating a bitstream BS generated by compressing pixel values of pixels included in one pixel group PG. For the ease of understanding, an embodiment in which one pixel group PG includes four pixels (e.g., first pixel P1 to fourth pixel P4) and one pixel includes 10 bits will be described.

Referring to FIGS. 5A and 5B, the bitstream BS may include 20 bits, and may include 4 bits for a header HEADER, 4 bits for indicating a bad pixel flag BP FLAG, and 12 bits for a difference value RES. The header HEADER may include information related to compression of the image data IDT. For example, the header HEADER may include information such as a compression method, a compression mode, a compression rate, loss information, or the like. The decoder 230 may check the header HEADER and decompress the bitstream BS according to a method corresponding to the header HEADER.

The bad pixel flag BP FLAG may include information indicating a bad pixel in the pixel group PG. Each of the 4 bits forming the bad pixel flag BP FLAG may correspond to each of the first pixel P1 to the fourth pixel P4 of the pixel group PG. For example, in the bad pixel flag BP FLAG, a first bit may correspond to the first pixel P1, a second bit may correspond to the second pixel P2, a third bit may correspond to the third pixel P3, and a fourth bit may correspond to the fourth pixel P4. In addition, when each of the 4 bits of the bad pixel flag BP FLAG has a particular value (e.g., 1 or 0), it may mean that a pixel corresponding to a corresponding bit is a bad pixel.

The difference value RES may include difference values of normal pixels compared to a reference value in the pixel group PG. Here, a difference values of the normal pixels indicate a difference value between a reference value determined based on the first reference map RM1 described above with reference to FIGS. 3 and 4 and a pixel value of a target pixel, which may be a normal pixel or a bad pixel. When a difference value between a reference value and a pixel value of a target pixel is not included in a range that may be represented by a bit allocated in the bitstream BS, a least significant bit (LSB) of the difference value may be removed. When the difference value is included in a range that may be represented by a bit allocated in the bitstream BS, the difference value may be included in the bitstream BS.

According to the inventive concept, as the number of bad pixels in the pixel group PG increases, the number of bits allocated to a difference value between normal pixels may also increase. For example, referring to FIG. 5A, because there is one bad pixel (e.g., the fourth pixel P4) in the pixel group PG, difference values RES1, RES2, and RES3 between three other normal pixels P1, P2, and P3 may be formed by 12 bits. For example, 4 bits may be allocated to each of the difference values RES1, RES2, and RES3. Referring to FIG. 5B, because there are two bad pixels, which are the third pixel P3 and the fourth pixel P4, in the pixel group PG, difference values RES1 and RES2 between two other normal pixels P1 and P2 may be formed by 12 bits. For example, 6 bits may be allocated to each of the difference values RES1 and RES2. Because a range of difference values increases as the number of allocated bits increases, data loss may decrease. The number of bits allocated to each of normal pixels may be the same or different from each other.

The decoder 230 may restore pixel values of the pixel group PG based on the bitstream BS. First, the decoder 230 may restore pixel values of the normal pixels based on the difference value RES. Also, the decoder 230 may restore pixel values of a bad pixel based on the restored pixel values of the normal pixels. A detail description of a restoration of the decoder 230 will be described below in FIGS. 9A and 9B.

The number of bits forming each of the header HEADER, the bad pixel flag BP FLAG, and the difference value RES is not limited to the above-described example, and the number of bits may be set differently according to embodiments.

Figure 6:
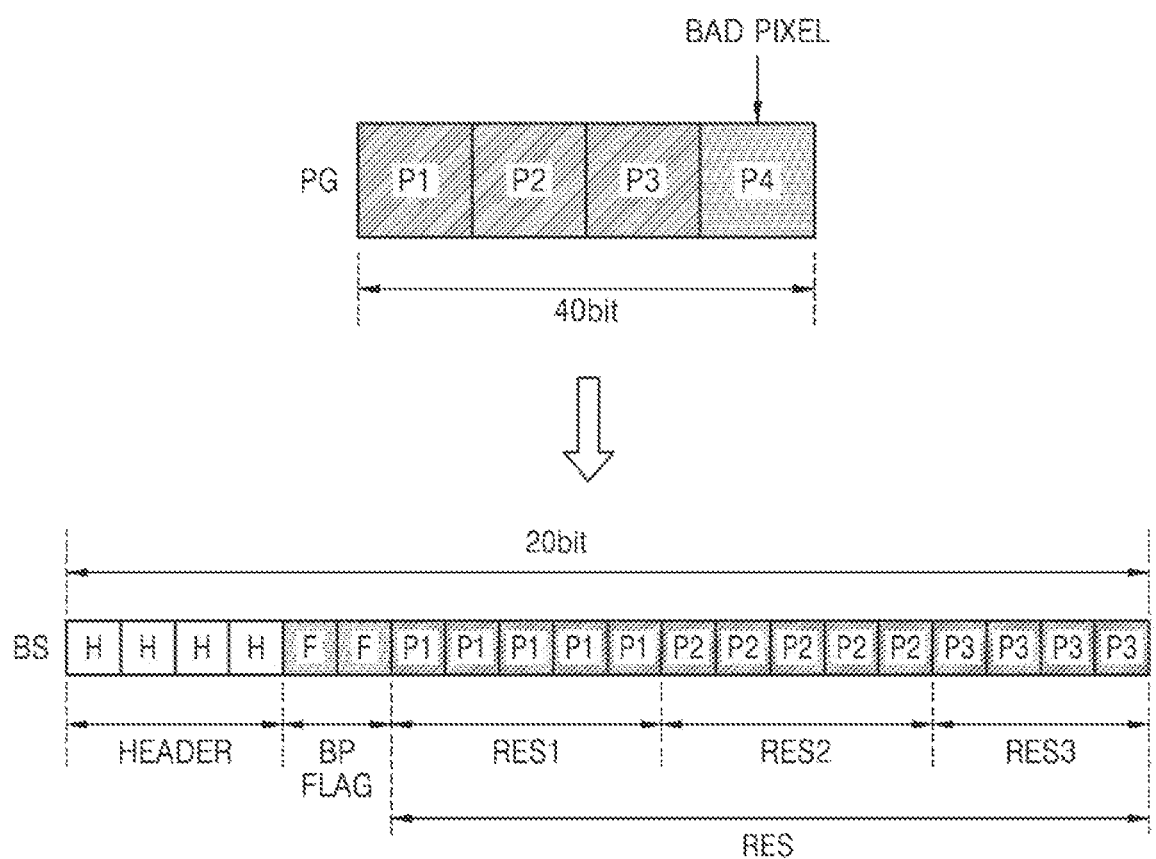
FIG. 6 is a diagram illustrating a bitstream according to an embodiment.

FIG. 6 is a diagram illustrating an encoded bitstream according to an embodiment. Specifically, FIG. 6 is a diagram showing a modifiable embodiment of FIGS. 5A and 5B. Description of FIG. 6 overlapping with those description made above with reference to FIGS. 5A and 5B will be omitted.

Referring to FIG. 6, the bitstream BS may include 20 bits, and may include 4 bits indicating a header HEADER, 2 bits indicating a bad pixel flag BP FLAG, and 14 bits indicating a difference value RES.

The bitstream BS of FIG. 6 may be applied when one bad pixel is included in the pixel group PG, and 2 bits forming the bad pixel flag BP FLAG may have a value representing a bad pixel among four pixels (e.g., first to fourth pixels P1 to P4) in the pixel group PG. For example, when the first pixel P1 is a bad pixel, the bad pixel flag BP FLAG may have a value of 00. When the second pixel P2 is a bad pixel, the bad pixel flag BP FLAG may have a value of 01. When the third pixel is a bad pixel, the bad pixel flag BP FLAG may have a value of 10. When the fourth pixel is a bad pixel, the bad pixel flag BP FLAG may have a value of 11.

According to an embodiment, because only 2 bits are allocated to the bad pixel flag BP FLAG, more bits may be allocated to the difference value RES compared to the embodiment of FIG. 5A. Accordingly, data loss of the difference value RES may be reduced. Although FIG. 6 illustrates that 5 bits are allocated to a difference value RES1, 5 bits are allocated to a difference value RES2, and 4 bits are allocated to a difference value RES3, the inventive concept is not limited thereto. The number of bits may be differently set according to embodiments.

According to FIGS. 5A to 6, because 40 bits forming the pixel group PG are compressed into 20 bits of the bitstream BS, the image data IDT may be compressed at a compression rate of 50%. However, the inventive concept is not limited thereto. The number of bits of the bitstream BS may be set to be less than or greater than 20 bits, and accordingly, a compression rate may be increased or decreased.

Figure 7:
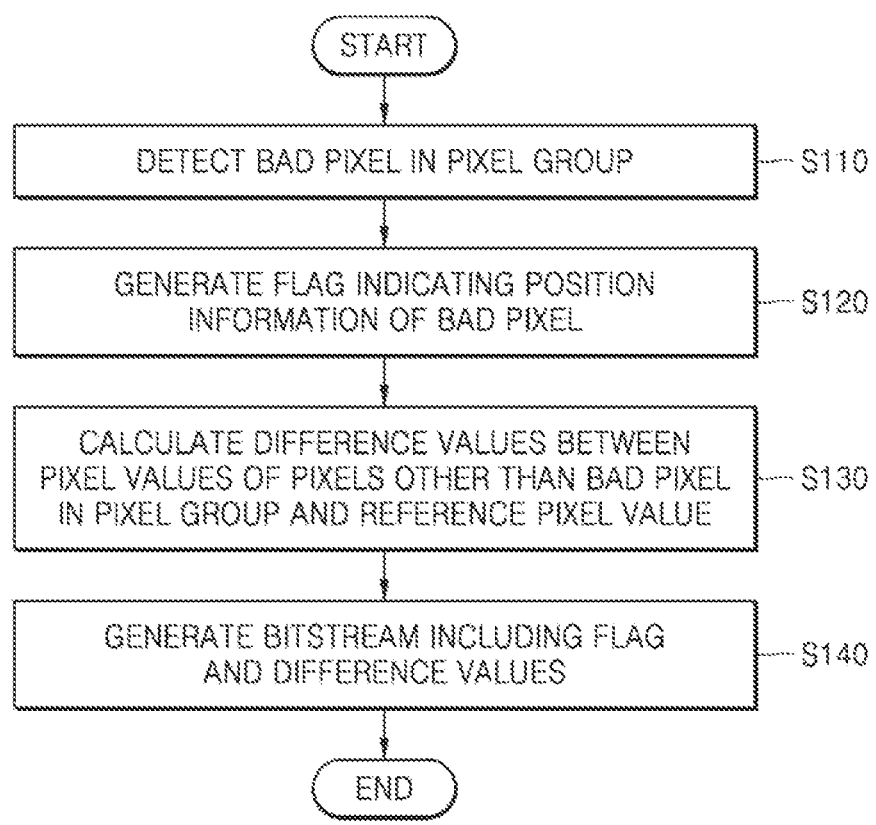
FIG. 7 is a flowchart showing an image compression method according to an embodiment.

FIG. 7 is a flowchart showing an image compression method according to an embodiment. In particular, FIG. 7 is a flowchart illustrating the image compression method of the image processing system 10 of FIG. 1. At least one of the operations of FIG. 7 may be performed by the encoder 120.

Referring to FIGS. 1 and 7, in operation S110, the encoder 120 may detect a bad pixel in a pixel group for each of a plurality of pixel groups forming the image data IDT. The encoder 120 may detect a bad pixel based on at least one of pixel values of pixels in the pixel group and pixels adjacent to the pixel group in the image data IDT. For example, to detect whether a target pixel is a bad pixel among the pixels in the pixel group, the encoder 120 may calculate an average pixel value of pixels adjacent to the target pixel. Also, the encoder 120 may detect whether the target pixel is a bad pixel based on a difference value between the calculated average pixel value and a pixel value of the target pixel. For example, when the difference value between the average pixel value and the pixel value of the target pixel exceeds a threshold value, the encoder 120 may detect the target pixel as a bad pixel.

Also, in operation S120, the encoder 120 may generate a flag indicating position information of a bad pixel. The flag may have a value corresponding to a position of at least one bad pixel included in a pixel group. In addition, in operation S130, the encoder 120 may calculate difference values between pixel values of pixels other than the bad pixel in the pixel group and a reference pixel value. The encoder 120 may determine the reference pixel value based on reference information (e.g., the first reference map RM1) including pixel values corresponding to pixels which are compressed prior to the pixel group. For example, the encoder 120 may determine the reference pixel value based on a pixel value of at least one pixel adjacent to the pixel group in the reference information. A detailed description of a method of determining a reference pixel value has been described with reference to FIGS. 3 and 4, and thus, redundant descriptions thereof are omitted.

In operation S140, the encoder 120 may generate a bitstream including the flag and the difference values. The encoder 120 may generate compression information indicating a compression method applied to a pixel group. Also, the encoder 120 may include the generated compression information in the bitstream. For example, the encoder 120 may include the compression information in a header of the bitstream.

Moreover, after generating the bitstream, the encoder 120 may update the reference information based on pixel values corresponding to pixels in the pixel group. In particular, the encoder 120 may correct a pixel value of a bad pixel in the pixel group. For example, the encoder 120 may correct the pixel value of the bad pixel based on a pixel value of a pixel adjacent to the bad pixel. A detailed description of a method of correcting a pixel value of a bad pixel has been described with reference to FIGS. 3 and 4, and thus, redundant descriptions thereof are omitted. In addition, the encoder 120 may update the reference information by adding pixel values of pixels other than the bad pixel in the pixel group and a corrected pixel value of the bad pixel to the reference information.

Figure 8:
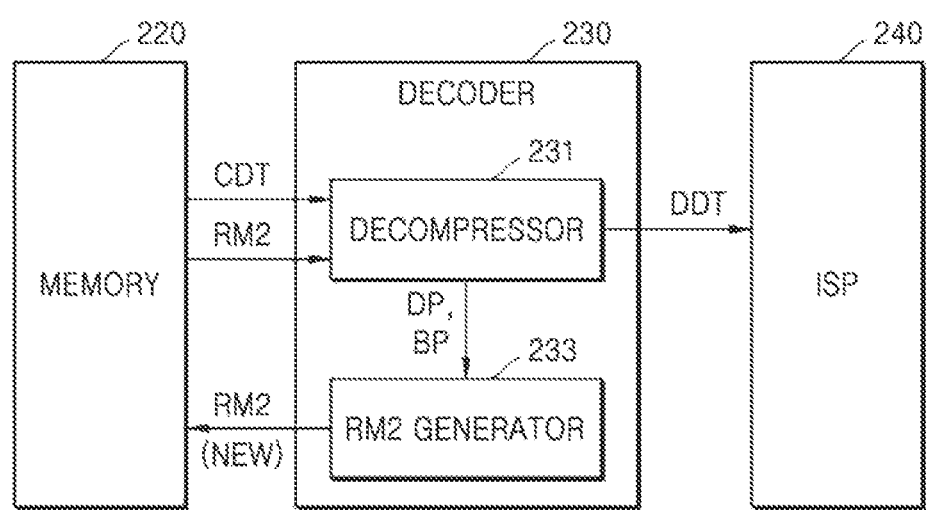
FIG. 8 is a diagram illustrating a decoder according to an embodiment.

FIG. 8 is a diagram illustrating the decoder 230 according to an embodiment. FIG. 8 is a diagram illustrating the decoder 230 of FIG. 1. Referring to FIGS. 1 and 8, the decoder 230 may include a decompressor 231 and a second reference map generator 233.

The decompressor 231 may receive the compressed data CDT and the second reference map RM2 from the memory 220 and decompress the compressed data CDT by using the second reference map RM2, thereby generating the decompressed data DDT. The decompressor 231 may sequentially decompress a plurality of bitstreams BS included in the compressed data CDT by using the second reference map RM2 generated based on pixel values of pixels which are decompressed before. A detailed description of this will be given below with reference to FIGS. 9A and 9B.

When one bitstream BS is decompressed, the decompressor 231 may provide restored pixel information DP including pixel values of decompressed pixels to the second reference map generator 233. In addition, the decompressor 231 may identify a bad pixel through a bad pixel flag BP FLAG of the bitstream BS and provide bad pixel information BP about the identified bad pixel to the second reference map generator 233.

The second reference map generator 233 may generate a new second reference map RM2 (NEW) based on the restored pixel information DP and the bad pixel information BP received from the decompressor 231. That is, the second reference map generator 233 may identify a bad pixel in a restored pixel group based on the bad pixel information BP. Also, the second reference map generator 233 may correct the pixel value of the bad pixel among restored pixel values to a value similar to pixel values of neighboring pixels. Accordingly, the second reference map generator 233 may generate the new second reference map RM2(NEW) by adding or replacing restored pixel values of normal pixels in the pixel group and a correct pixel value of the bad pixel to the second reference map RM2. A detailed description of this will be given below with reference to FIGS. 9A and 9B.

The second reference map generator 233 may store the generated new second reference map RM2(NEW) in the memory 220. The decompressor 231 may read the new second reference map RM2(NEW) stored in the memory 220 and perform decompression on a pixel group in a next order based on the read new second reference map RM2 (NEW).

Each of the decompressor 231 and the second reference map generator 233 may be implemented as software or hardware, or a combination of software and hardware such as firmware. When the decompressor 231 and the second reference map generator 233 are implemented as software, each of the above-described functions may be implemented as programmed source code and may be loaded into a storage medium included in the image processing device 200. A processor (e.g., a microprocessor) included in the image processing device 200 may execute software, and thus functions of the decompressor 231 and the second reference map generator 233 may be implemented. When the decompressor 231 and the second reference map generator 233 are implemented as hardware, the decompressor 231 and the second reference map generator 233 may include a logic circuit and a register, and may perform the functions described above based on register setting.

Figure 9A:
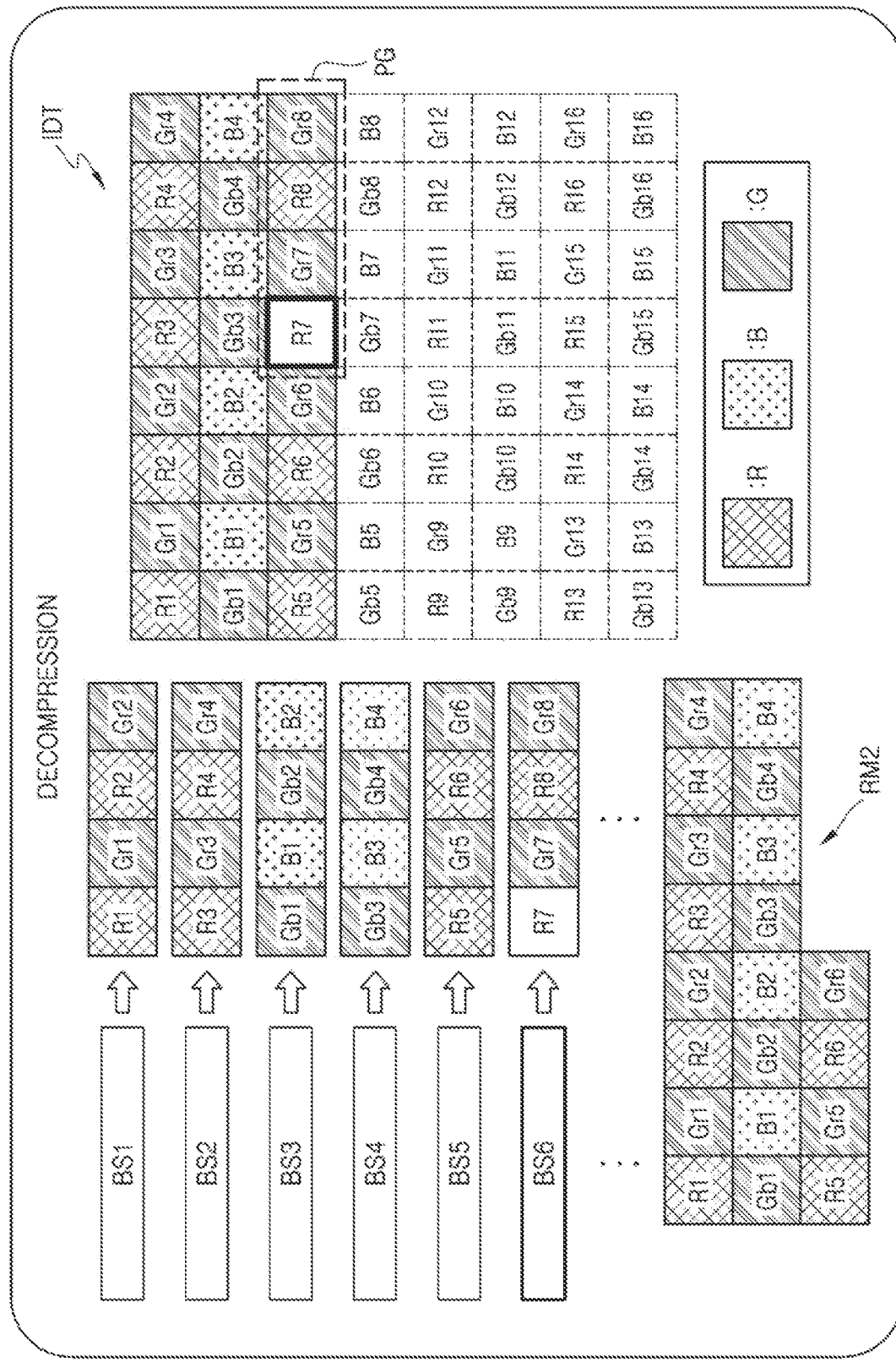
FIGS. 9A and 9B are conceptual diagrams showing an image decompression method according to embodiments.
Figure 9B:
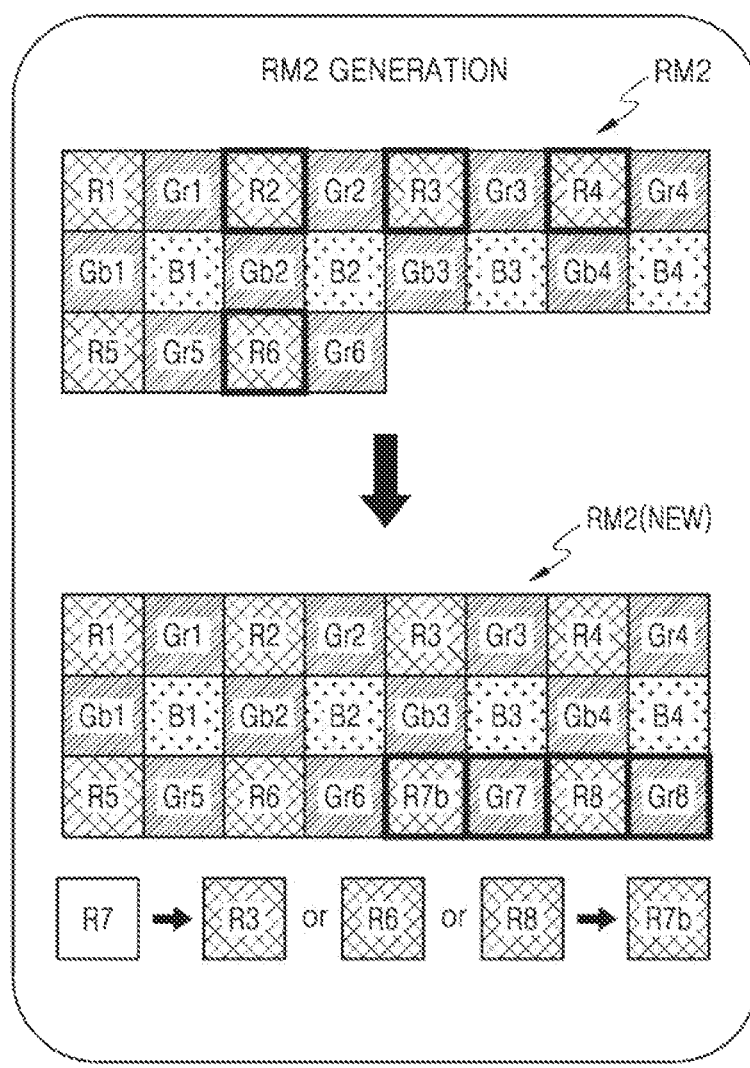

FIGS. 9A and 9B are conceptual diagrams showing an image decompression method according to embodiments. Specifically, FIGS. 9A and 9B are diagrams each showing a method of decompressing the image data IDT in a Bayer pattern performed by the decoder 230. Hereinafter, it is assumed that one pixel group is set to include four pixels which are sequentially arranged. In addition, an embodiment in which the decoder 230 decompresses a sixth bitstream BS6 corresponding to a pixel group PG including pixels R7, Gr7, R8, and Gr8 and a pixel R7 is a bad pixel will be described.

Referring to FIG. 9A, the decompressor 231 may decompress the sixth bitstream BS6 by using the second reference map RM2. Here, the second reference map RM2 may include pixel values of a first bitstream BS1 to a fifth bitstream BS5 which are decompressed prior to the sixth bitstream BS6.

The decompressor 231 may identify a bad pixel based on a bad pixel flag BP FLAG of the sixth bitstream BS6. Also, the decompressor 231 may perform decompression starting from normal pixels, which are not bad pixels.

In some embodiments, the decompressor 231 may select at least one pixel adjacent to a pixel group PG or a target pixel, which is a normal pixel, of the pixel group PG from the second reference map RM2. Also, the decompressor 231 may determine a reference value based on a pixel value of the selected pixel. Here, the method of determining a reference value may correspond to a method in which the compressor 123 determines a reference value in an operation of generating the sixth bitstream BS6. For example, when the compressor 123 determines a pixel value of a pixel at a particular position (e.g., on the left side of a target pixel) among pixels which are adjacent to the target pixel in the first reference map RM1 as a reference value, the decompressor 231 may determine a reference value by referring to a pixel value of a pixel at a particular position (e.g., on the left side of the target pixel) among pixels which are adjacent to the target pixel in the second reference map RM2. According to embodiments, information about a method in which the compressor 123 determines a reference value may be implemented to be included in a header HEADER of a bitstream BS.

In addition, the decompressor 231 may restore a pixel value of the target pixel based on the determined reference value and a difference value RES of the target pixel included in the sixth bitstream BS6. That is, the decompressor 231 may restore the pixel value of the target pixel by adding the difference value RES of the target pixel to the determined reference value. For example, when a target pixel is the pixel Gr7, the decompressor 231 may restore a pixel value of the pixel Gr7 by adding a difference value RES of the pixel Gr7 to the reference value.

When normal pixels are restored, the decompressor 231 may restore a pixel value of a bad pixel. A difference value RES of the bad pixel may not be included in the sixth bitstream BS6. Accordingly, the decoder 230 may calculate an average pixel value of pixel values of the restored normal pixels and add the calculated average pixel value to a threshold value to restore the pixel value of the bad pixel. The threshold value may be the same as the threshold value used in the bad pixel detection operation described above with reference to FIG. 3, but the inventive concept is not limited thereto, and various values may be set as the threshold value.

For example, when the bad pixel is the pixel R7, the decoder 230 may calculate an average pixel value of pixels Gr7, R8, and Gr8, which are restored normal pixels, and add the calculated average pixel value to the threshold value to restore the pixel value of the bad pixel R7. A method in which the decoder 230 restores a bad pixel is not limited to the above-described example, and a bad pixel may be restored in various methods.

When the pixel group PG is decompressed, the second reference map generator 233 may generate a new second reference map RM2(NEW) by adding pixel values of the decompressed pixel group PG to the existing second reference map RM2.

In particular, when a bad pixel is not included in a pixel group, the second reference map generator 233 may generate the new second reference map RM2(NEW) by adding decompressed pixel values to the existing second reference map RM2.

On the contrary, when a bad pixel is included in a pixel group, the second reference map generator 233 may correct a pixel value of the bad pixel among the restored pixel values based on pixel values of pixels adjacent to the bad pixel. A method of correcting a pixel value of a bad pixel may be performed similarly to the method of correcting a pixel value of a bad pixel described above with reference to FIG. 3.

For example, referring to FIG. 9B, the second reference map generator 233 may correct the pixel value of the pixel R7 to a pixel value of a pixel (e.g., R3) corresponding to the same red color as the pixel R7 and positioned on the upper side of the pixel R7, where the pixel R7 is a target pixel having a bad pixel. As another example, the second reference map generator 233 may correct the pixel value of the pixel R7 to a pixel value of a pixel (e.g., R6) positioned on the left side of the pixel R7. As another example, the second reference map generator 233 may correct the pixel value of the pixel R7 to a pixel value of a pixel (e.g., R8) positioned on the right side of the pixel R7. As another example, the second reference map generator 233 may correct the pixel value of the pixel R7 to an average pixel value of pixels (e.g., R2 and R4) positioned diagonally to the pixel R7. The corrected value of the target pixel R7 may be a pixel value R7b shown in the new second reference map RM2 (NEW).

In addition, the second reference map generator 233 may generate the new second reference map RM2(NEW) by adding pixel values of restored normal pixels and a corrected pixel value of the bad pixel to the existing second reference map RM2.

As described above, when one pixel group PG is decompressed, the second reference map generator 233 may generate the new second reference map RM2(NEW) by adding pixel values (i.e., pixel values of restored normal pixels of the pixel group PG and a corrected pixel value of a bad pixel) corresponding to the pixel group PG to the existing second reference map RM2 so as to decompress a pixel group in a next order.

Figure 10:
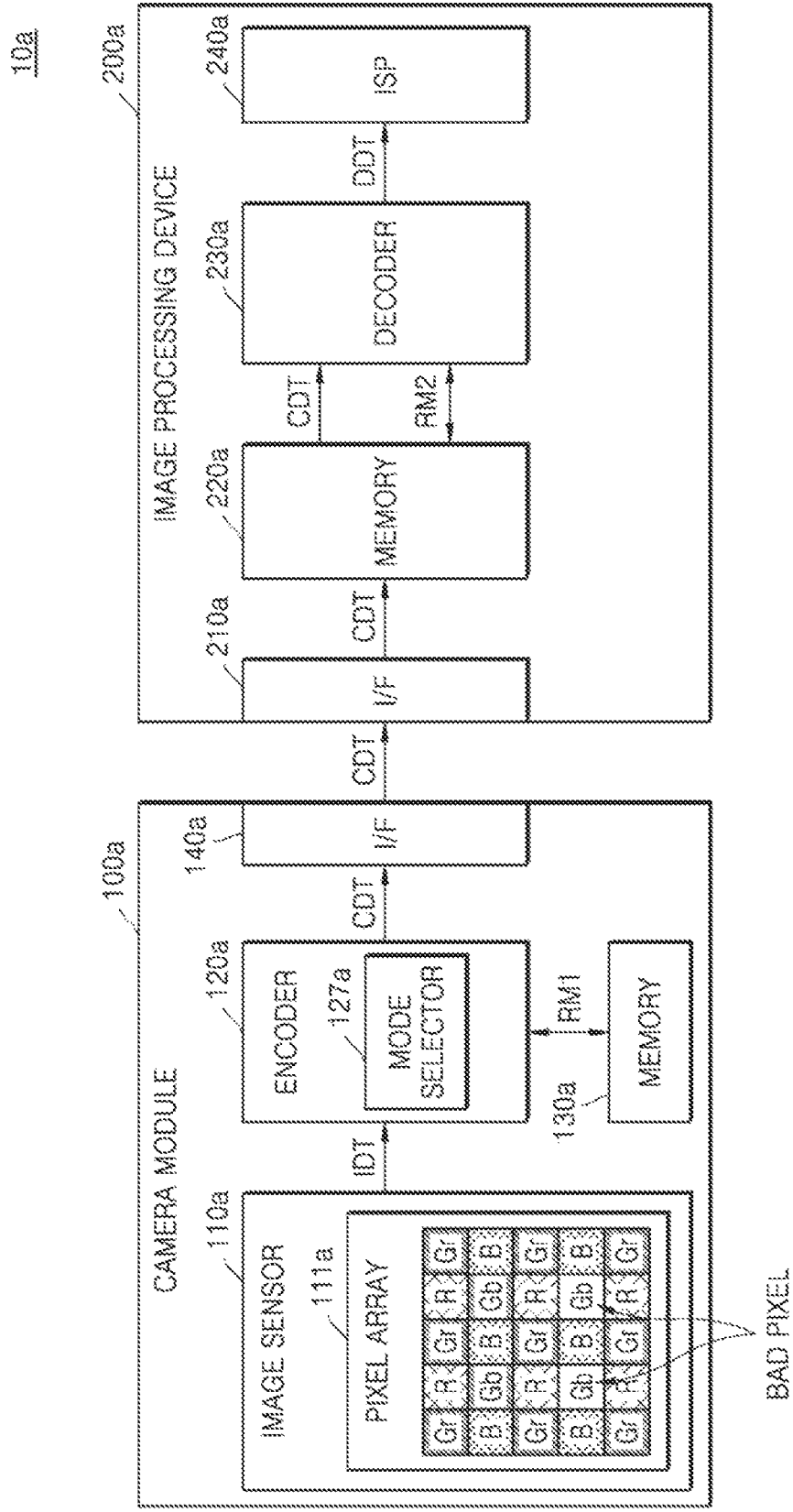
FIG. 10 is a diagram illustrating an image processing system according to an embodiment.

FIG. 10 is a diagram illustrating an image processing system 10a according to an embodiment. Specifically, FIG. 10 is a diagram showing another embodiment of the image processing system 10 shown in FIG. 1.

Referring to FIG. 10, the image processing system 10a may include a camera module 100a and an image processing device 200a. The camera module 100a may include an image sensor 110a, an encoder 120a, a memory 130a, and an interface 140a. The image processing device 200a may include an interface 210a, a memory 220a, a decoder 230a, and an ISP 240a.

Compared with the image processing system 10 of FIG. 1, the image processing system 10a of FIG. 10 further includes a mode selector 127a in the encoder 120a, and other configurations thereof may be substantially the same as those of the image processing system 10 of FIG. 1. Among the configurations of the image processing system 10a, descriptions of configurations overlapping with those of the image processing system 10 of FIG. 1 will be omitted.

According to this embodiment, the encoder 120a may generate a plurality of pieces of compressed data CDT by compressing the image data IDT in a plurality of compression modes. Herein, each of the plurality of compression modes may be set based on a compression target, a compression rate, an error rate, and/or loss information. Also, the encoder 120a may include mode information in a header of a bitstream during compression. A detailed description of the plurality of compression modes will be described below wither reference to FIGS. 12A and 12B.

For example, the encoder 120 may generate a first reference map RM1 including a pixel value of a bad pixel, which has not been corrected, and may compress the image data IDT in a first mode in which a bad pixel detection operation for the first reference map RM1 is performed during a compression operation using the first reference map RM1. In this case, information indicating the first mode may be included in a header of a bitstream.

In addition, the encoder 120a may generate a first reference map RM1 including a corrected pixel value of a bad pixel according to above-described methods with reference to FIGS. 1 to 9B, and may compress the image data IDT in a second mode in which a compression operation is performed without a bad pixel detection operation for the first reference map RM1. In this case, information indicating the second mode may be included in a header of a bitstream.

The inventive concept is not limited thereto, and the encoder 120a may compress the image data IDT in three or more modes. In addition, a compression method of each of the plurality of compression modes may be set differently from the above-described embodiments.

The mode selector 127a of the encoder 120a may select one of a plurality of modes and transmit the compressed data CDT corresponding to the selected compression mode to the image processing device 200a through the interface 140a. Here, the mode selector 127a may be a switch implemented in the form of software and/or hardware. Moreover, the mode selector 127a may select a mode among a plurality of modes according to a compression target, a compression rate, an error rate, and/or loss information, and mode information may be included in the header of the bitstream. For example, a compression rate may be set based on a user input, a manufacturing specification, and etc., and the mode selector 127a may select the plurality of modes based on a predetermined compression rate. In some embodiments, the mode selector 127a may select one of the plurality of modes based on error data of the plurality of modes. Herein, error data refers to data representing a difference between data obtained by restoring the compressed data CDT in a particular mode and the image data IDT. The mode selector 127a may select a mode having the fewest error based on error data of a plurality of modes and transmit the compressed data CDT corresponding to the selected mode to the image processing device 200a.

According to the inventive concept, the decoder 230a may generate a plurality of pieces of decompressed data DDT by decompressing the compressed data CDT in a plurality of modes. In particular, the decoder 230a may check mode information based on a header of a bitstream included in the compressed data CDT. Also, the decoder 230a may decompress the bitstream according to a decompression method corresponding to the checked mode information.

For example, when the header of the bitstream includes mode information indicating the first mode described above, the decoder 230a may decompress the bitstream according to a decompression method corresponding to the first mode. In addition, when the header of the bitstream includes mode information indicating the second mode described above, the decoder 230a may decompress the bitstream according to a decompression method corresponding to the second mode.

Figure 11:
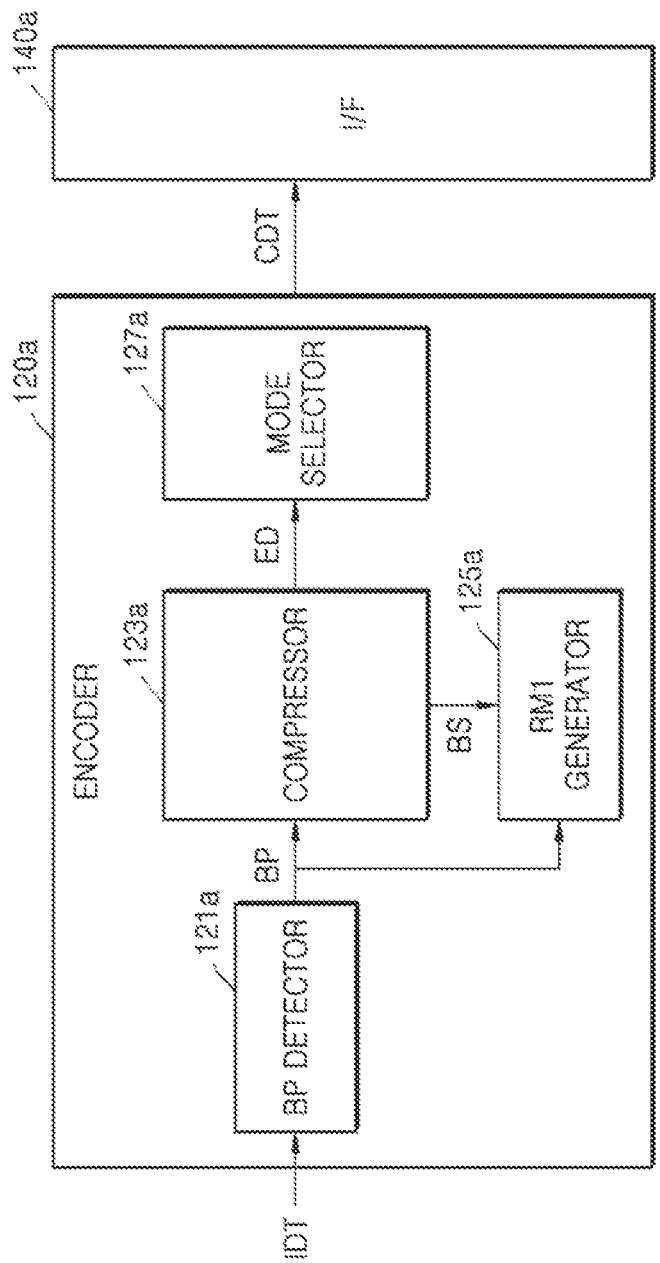
FIG. 11 is a diagram illustrating an encoder according to an embodiment.

FIG. 11 is a diagram illustrating the encoder 120a according to an embodiment.

FIG. 11 illustrates the encoder 120a of FIG. 10 in more detail. Referring to FIGS. 10 and 11, the encoder 120a may include a bad pixel detector 121a, a compressor 123a, a first reference map generator 125a, and the mode selector 127a.

Referring to FIG. 11, the bad pixel detector 121a, the compressor 123a, and the first reference map generator 125a may generate the plurality of pieces of compressed data CDT by performing compression on the image data IDT according to a compression method corresponding to each of a plurality of modes. Also, the compressor 123a may generate error data ED based on the plurality of compressed data CDT. In some embodiments, the bad pixel detector 121a, the compressor 123a, and/or the first reference map generator 125a may compress the image data IDT in each of the plurality of modes under a control by the mode selector 127a.

With respect to each of the plurality of pieces of compressed data CDT, the compressor 123a may generate restored data by restoring each of the plurality of pieces of compressed data CDT and calculate an error between the restored data and the image data IDT. Also, the compressor 123a may generate the error data ED including errors of the plurality of modes. In addition, the compressor 123a may transmit the error data ED to the mode selector 127a.

The mode selector 127a may identify a mode having the lowest error based on the error data ED, and transmit the compressed data CDT corresponding to the identified mode to the image processing device 200a through the interface 140a.

According to this embodiment, the compressor 123a may generate the error data ED for each pixel group. That is, the compressor 123a may calculate an error between each of n pixel groups (where, n is a positive integer) forming the image data IDT and each of n pixel groups forming restored data. In addition, the compressor 123a may generate the error data ED of each pixel group, the error data ED including errors of the plurality modes. The mode selector 127a may identify, for each pixel group, a mode having the lowest error based on the error data ED and transmit a bitstream corresponding to the identified mode to the image processing device 200a. For example, the mode selector 127a determines a mode in which the decoder 230a may decompress the compressed data CDT so that, when decompressed, the decompressed data DDT has the lowest error rate. Here, an error may be referred to as an error generated during restoring the compressed image data CDT by the decoder 230a. However, an error is not limited thereto, and may include other aspects or causes in which distortion may occur with respect to an original image.

In the above-describe embodiment, although it is described that the bad pixel detector 121a, the compressor 123a, and the first reference map generator 125a generate the plurality of pieces of compressed data CDT by performing compression according to a compression method corresponding to each of the plurality of modes, the inventive concept is not limited thereto. For example, the encoder 120a may be implemented to include a bad pixel detector 121a, a compressor 123a, and/or a first reference map generator 125a corresponding to each of the plurality of modes. For example, the encoder 120a may be implemented to include a bad pixel detector 121a, a compressor 123a, and/or a first reference map generator 125a corresponding to the first mode, and include a bad pixel detector 121a, a compressor 123a, and/or a first reference map generator 125a corresponding to the second mode.

Although the mode selector 127a is illustrated and described as being included in the encoder 120a with reference to FIGS. 10 and 11, the inventive concept is not limited thereto. For example, the mode selector 127a may be implemented as a separate configuration from the encoder 120a in the camera module 100a.

FIGS. 12A and 12B are tables explaining compression information according to an example embodiment of the inventive concept. In detail, FIGS. 12A and 12B show a compression mode (compression method) according to a standard proposed by the MIPI association. Description will be made with reference to FIGS. 10 and 11 together.

Referring to FIG. 12A, image data IDT of FIG. 3 in a Bayer pattern may be compressed according to various compression modes. As examples of a compression mode, a Pixel-based Directional Differential (PD) mode, a DiaGonal Direction-based Differential (DGD) mode, an extended Slanted Horizontal or Vertical Direction-based Differential (eSHV) mode, an OUTlier compensation (OUT) mode, and/or a Fixed quantization and No-Reference (FNR) mode may be used. However, the compression mode is not limited thereto, and may include any other compression mode capable of compressing data.

In the PD mode, DPCM may be performed on the image data IDT in a Bayer pattern. The PD mode may be classified into MODE0, MODE1, MODE2, MODE3, MODE12, and MODE13 according to a detailed implementation algorithm. Because 4 bits may be allocated to a header indicating a compression method, sixteen compression modes may each be expressed in a header with different bit values. For example, MODE0 may be expressed as bits 0000, MODE1 may be expressed as bits 0001, MODE2 may be expressed as bits 0010, MODE3 may be expressed as bits 0011, MODE12 may be expressed as bits 1100, and MODE13 may be expressed as bits 1101.

In the DGD mode, DPCM may be performed on the image data IDT in a diagonal structure. The DGD mode may be classified into MODE4 (bits 0100), MODE5 (bits 0101), MODE8 (bits 1000), MODE9 (bits 1001), MODE10 (bits 1010), and MODE11 (bits 1011) according to a detailed implementation algorithm.

Similarly, the eSHV mode may include MODE14 (bits 1110) and MODE15 (bits 1111), the OUT mode may include MODE7 (bits 0111), and the FNR mode may include MODE6 (bits 0110). According to an embodiment, MODE7 may refer to the OUT mode including a bad pixel (BP) mode processing bad pixels, or a saturation mode, but one of two modes (the saturation mode or the OUT mode) may be selected according to an operating environment.

In an embodiment, the mode selector 127a may sequentially evaluate the PD mode, the DGD mode, the eSHV mode, the OUT mode, and the FNR mode, and may select an optimal mode according to a compression evaluation index including an index, such as a compression rate and loss information. However, the inventive concept is not limited to the above described mode evaluation order.

Referring to FIG. 12B, image data (IDT of FIG. 4) in a tetra pattern may be compressed according to various compression modes. The inventive concept is not limited thereto, and image data, in which a red pixel group, a blue pixel group, a first green pixel group, and a second green pixel group are repeatedly arranged, may be also compressed in various compression modes. For example, the image data may include the red pixel group, the blue pixel group, the first green pixel group, and the second green pixel group which include pixels arranged in 2n×2n or 3n×3n (where, n is a positive integer).

As a compression mode, an Average-based Directional Differential (AD) mode, an extended Horizontal or Vertical Direction-based Differential (eHVD) mode, an Oblique Direction-based Differential (OD) mode, an extended Multi-Pixel-based Differential (eMPD) mode, an extended Horizontal or Vertical Average-based Differential (eHVA) mode, an extended OUTlier compensation (eOUT) mode, or the FNR mode is used.

In the AD mode, DPCM may be performed on the image data IDT in which one pixel group PG forms a Bayer group including a plurality of pixels. The AD mode may be classified into MODE0, MODE1, MODE2, MODE3 according to a detailed implementation algorithm. Because 4 bits may be allocated to a header indicating a compression method, sixteen compression modes may each be expressed in header information as different bits from each other. For example, MODE0 may be expressed as bits 0000, MODE1 may be expressed as bits 0001, MODE2 may be expressed as bits 0010, and MODE3 may be expressed as bits 0011.

In the OD mode, compression may be performed on the image data IDT in a diagonal structure. The OD mode may be classified into MODE4 (bits 0100) and MODE5 (bits 0101) according to a detailed implementation algorithm.

Similarly, the eMPD may include MODE8 (bits 1000), MODE9 (bits 1001), MODE10 (bits 1010), and MODE11 (bits 1011), the eHVD mode may include MODE 12 (bits 1100) and MODE13 (bits 1101), the eHVA mode may include MODE14 (bits 1110), an (e) OUT mode (eOUT mode or OUT mode) may include MODE15 (bits 1111) and MODE7 (bits 0111), and the FNR mode may include MODE6 (bits 0110). According to an embodiment, MODE7 may refer to the (e) OUT mode including a BP mode processing bad pixels, or a saturation mode, but one of two modes (the saturation mode or the (e) OUT mode) may be selected according to an operating environment.

In an embodiment, the mode selector 127a may sequentially evaluate the AD mode, the eHVD mode, the OD mode, the eMPD mode, the eHVA mode, the eOUT mode, and the FNR mode, and may select an optimal mode according to a compression evaluation index including an index, such as a compression rate and loss information. However, the inventive concept is not limited to the described mode evaluation order.

Figure 13:
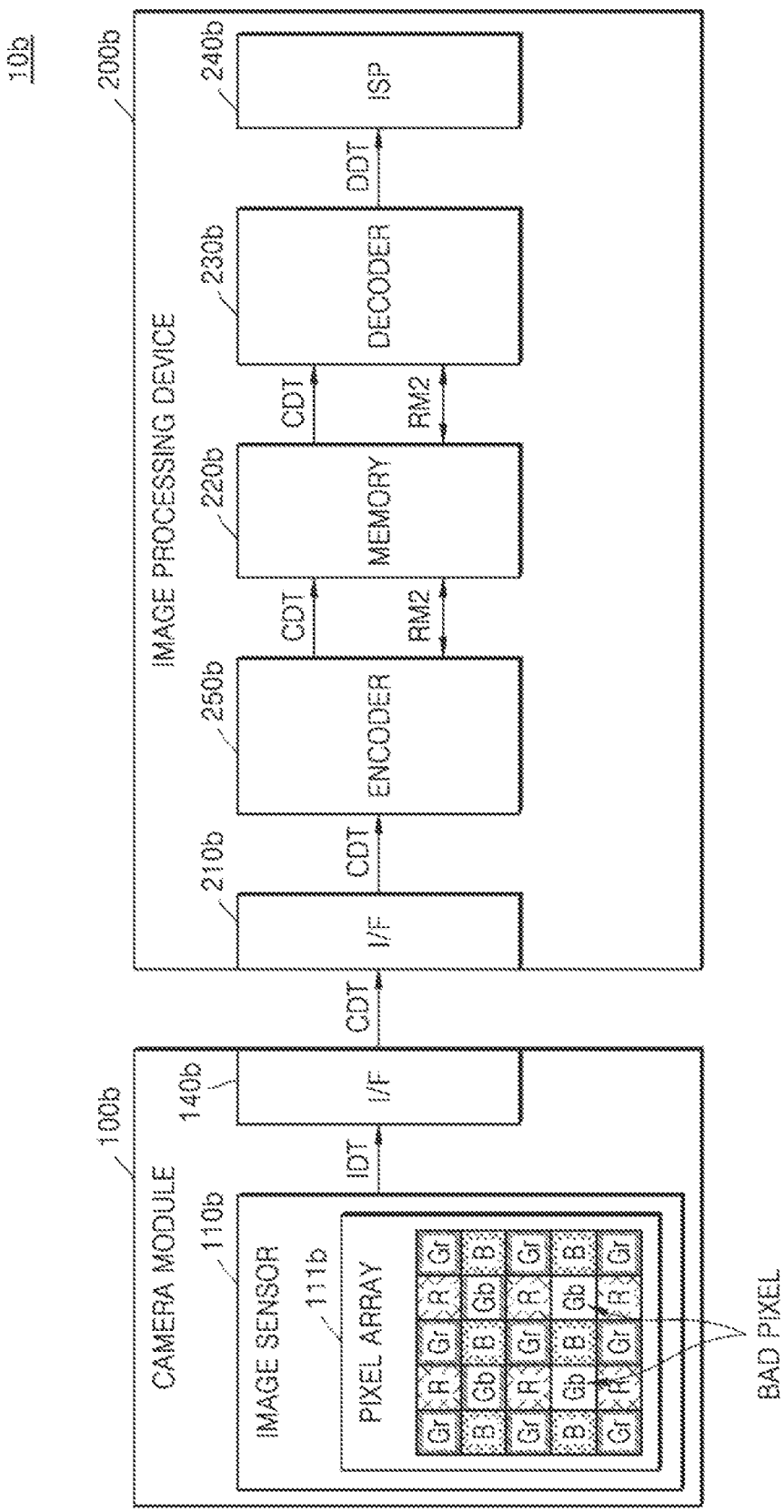
FIG. 13 is a diagram illustrating an image processing system according to an embodiment.

FIG. 13 is a diagram illustrating an image processing system 10b according to an embodiment. FIG. 13 illustrates another embodiment of the image processing system 10 of FIG. 1.

Referring to FIG. 13, the image processing system 10b may include a camera module 100b and an image processing device 200b. The camera module 100b may include an image sensor 110b and an interface 140b. The image processing device 200b may include an interface 210b, a memory 220b, a decoder 230b, an ISP 240b, and an encoder 250*b*. The encoder 250*b* of FIG. 13 may correspond to the encoder 120 of FIG. 1 or the encoder 120*a* of FIG. 10.

Comparing the image processing system 10*b* of FIG. 13 to the image processing system 10 of FIG. 1, a difference is that the encoder 250*b* is included in the image processing device 200*b* instead of the camera module 100*b*, and other configurations thereof may be substantially the same. Among the configurations of the image processing system 10*b*, descriptions of configurations overlapping with those of the image processing system 10 of FIG. 1 will be omitted.

Referring to FIG. 13, the image sensor 110*b* may generate image data IDT. The image data IDT may be transmitted to the image processing device 200*b* through the interface 140*b*. According to an embodiment, the camera module 100*b* may further include an ISP. The image data IDT may be image-processed by the ISP, and the processed image data IDT may be transmitted to the image processing device 200*b*.

The image processing device 200*b* may receive the image data IDT through the interface 210*b*. The encoder 250*b* may generate the compressed data CDT by compressing the image data IDT by using the first reference map RM1 stored in the memory 220*b*. A method in which the encoder 250*b* generates the compressed data CDT is described above, and thus, redundant descriptions will be omitted. The compressed data CDT may be stored in the memory 220*b*, and may be read by the decoder 230*b* from the memory 220*b*. The decoder 230*b* may generate the decompressed data DDT by decompressing the image data IDT by using the second reference map RM2 stored in the memory 220*b*. A method in which the decoder 230*b* generates the decompressed data DDT is substantially the same as the descriptions made above with reference to FIGS. 10 to 11, and thus, redundant descriptions will be omitted.

Figure 14:
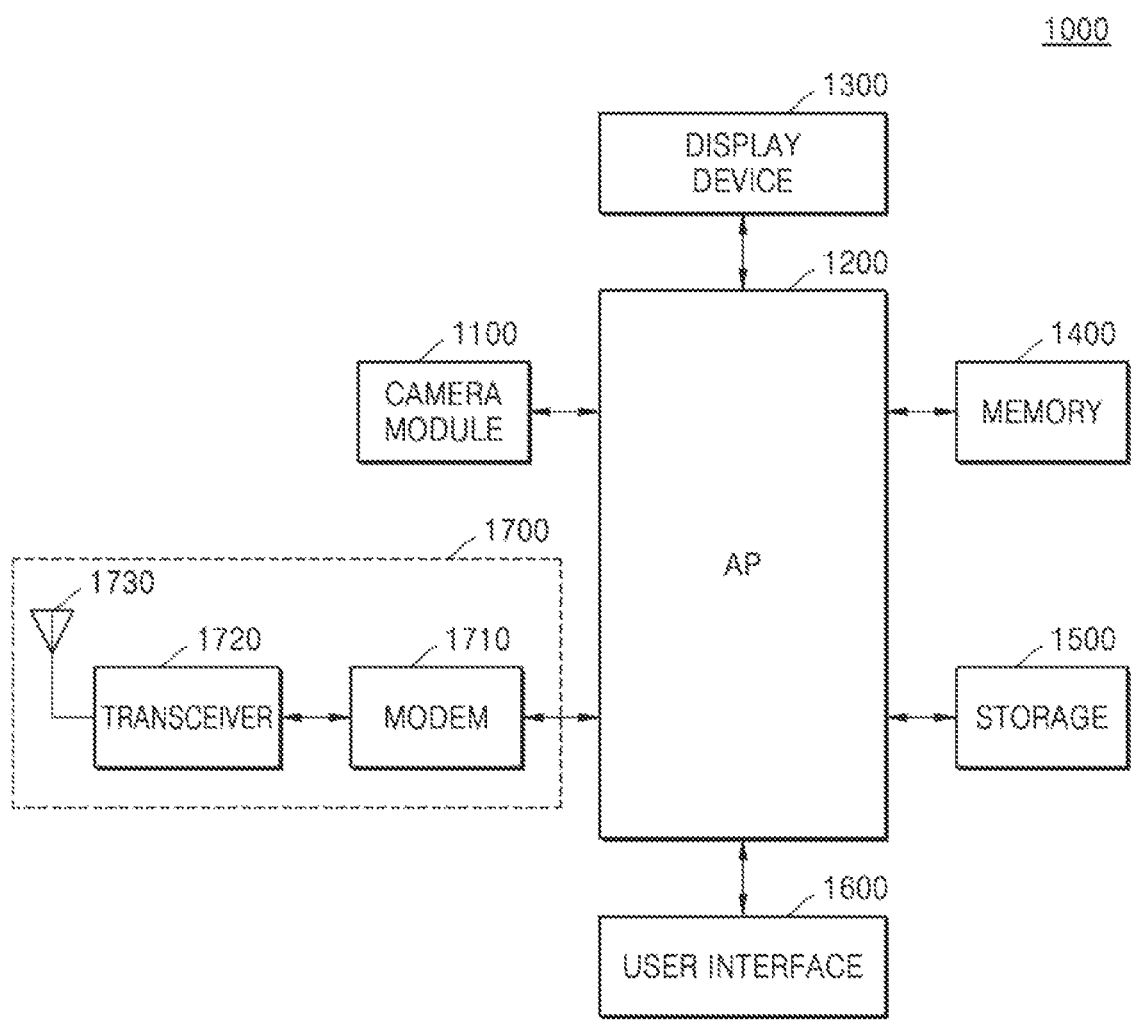
FIG. 14 is a diagram illustrating an electronic device according to an embodiment.

FIG. 14 is a diagram illustrating an electronic device 1000 according to an embodiment.

Referring to FIG. 14, the electronic device 1000 may include a camera module 1100, an application processor (AP) 1200, a display device 1300, a memory 1400, a storage 1500, a user interface 1600, and a wireless transceiver 1700. The camera module 1100 of FIG. 14 may correspond to the camera module 100 of FIG. 1, the camera module 100*a* of FIG. 10, or the camera module 100*b* of FIG. 13. The AP 1200 of FIG. 14 may include the image processing device 200 of FIG. 1, the image processing device 200*a* of FIG. 10, or the image processing device 200*b* of FIG. 13. Redundant descriptions with those described above with reference to FIGS. 1, 100, and 13 are omitted.

The AP 1200 controls the overall operation of the electronic device 1000 and may be provided as a system-on-chip (SoC) that drives an application program, an operating system, etc.

The memory 1400 may store programs and/or data processed or executed by the AP 1200. The storage 1500 may be implemented as a nonvolatile memory device such as a NAND flash or a resistive memory. For example, the storage 1500 may be provided as a memory card (Multimedia Card (MMC), embedded MMC (eMMC), Secure Digital (SD), micro SD) or the like. The storage 1500 may store data and/or programs for execution algorithms that control the image processing operation of the AP 1200, and data and/or programs may be loaded into the memory 1400 when the image processing operation is performed.

The user interface 1600 may be various devices capable of receiving a user input, such as a keyboard, a curtain key panel, a touch panel, a fingerprint sensor, a microphone, etc. The user interface 1600 may receive the user input and provide a signal corresponding to the received user input to the AP 1200. The wireless transceiver 1700 may include a modem 1710, a transceiver 1720, and an antenna 1730.

Figure 15:
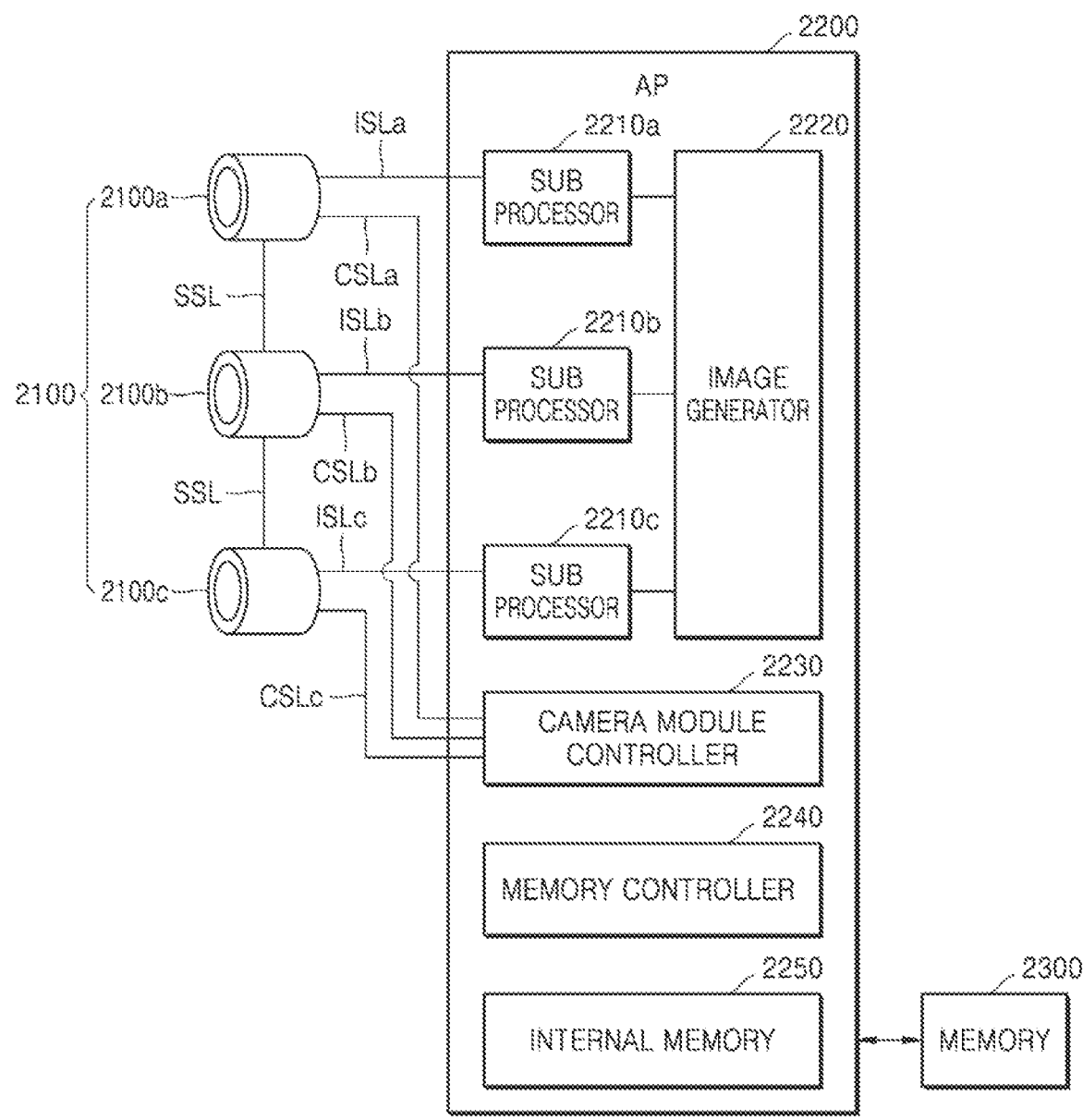
FIG. 15 is a diagram illustrating a portion of an electronic device according to an embodiment.
Figure 16:
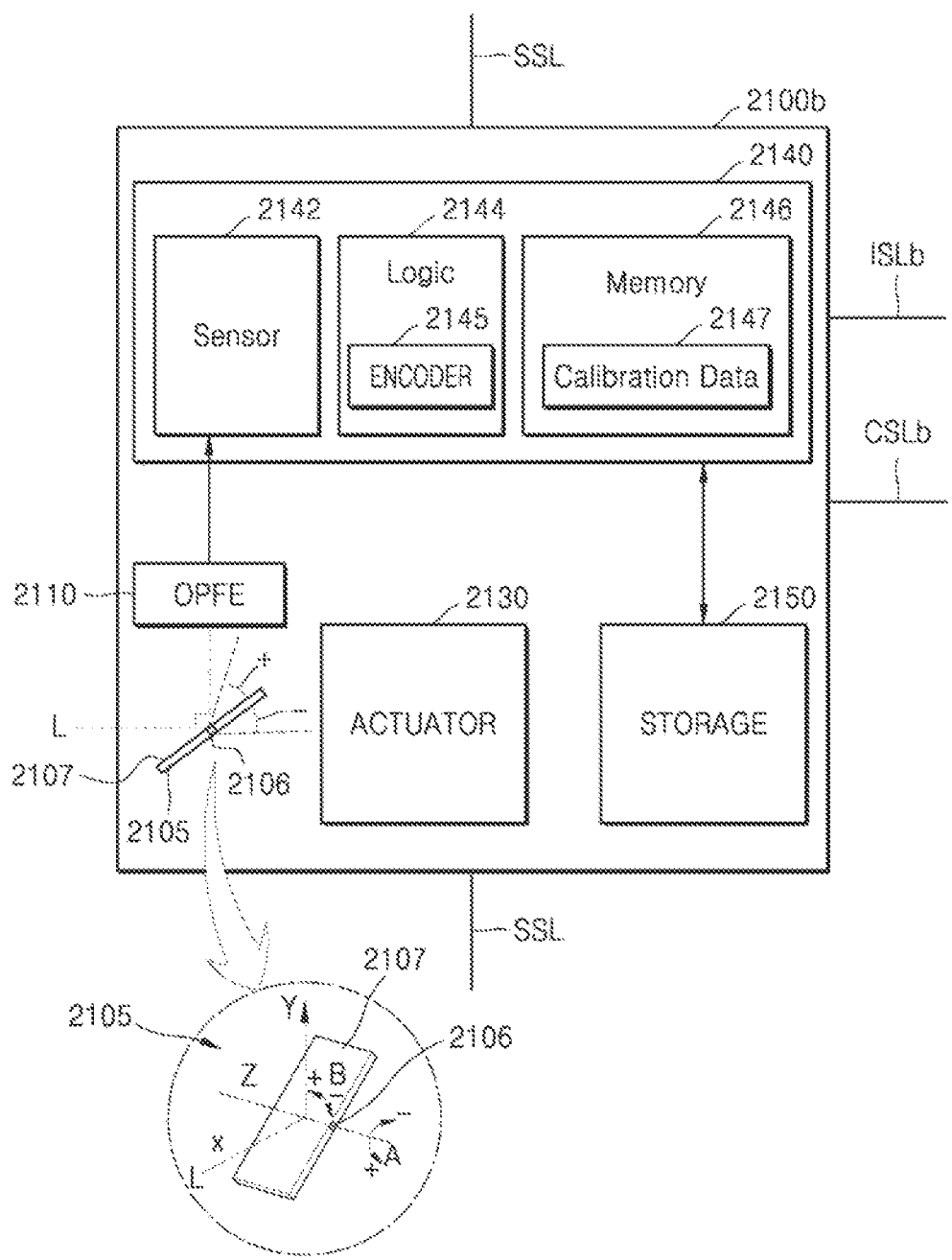
FIG. 16 is a diagram illustrating a detailed configuration of a camera module according to an embodiment.

FIG. 15 is a diagram illustrating a portion of an electronic device 2000 according to an embodiment. FIG. 16 is a diagram illustrating a detailed configuration of a camera module according to an embodiment. Specifically, FIG. 15 is a diagram illustrating the electronic device 2000 as a portion of the electronic device 1000 of FIG. 14, and FIG. 16 is a diagram illustrating the detailed configuration of a second camera module 2100*b* of FIG. 15.

Referring to FIG. 15, the electronic device 2000 may include a multi-camera module 2100, an AP 2200, and a memory 2300. The memory 2300 may perform the same function as the memory 1400 illustrated in FIG. 14, and thus, a redundant description is omitted.

The electronic device 2000 may capture and/or store an image of an object by using a CMOS image sensor, and may be implemented as a mobile phone, a tablet computer, or a portable electronic device. The portable electronic device may include a laptop computer, a mobile phone, a smartphone, a tablet PC, a wearable device, etc.

The multi-camera module 2100 may include a first camera module 2100*a*, the second camera module 2100*b*, and a third camera module 2100*c*. The multi-camera module 2100 may perform the same function as the camera module 100 of FIG. 1, the camera module 100*a* of FIG. 10, or the camera module 100*b* of FIG. 13. Although, in FIG. 15, the multi-camera module 2100 is shown as including the three camera modules (that is, the first camera module 2100*a*, the second camera module 2100*b* and the third camera module 2100*c*), the inventive concept is not limited thereto, and various number of camera modules may be included in the multi-camera module 2100.

Hereinafter, the detailed configuration of the second camera module 2100*b* will be described in more detail with reference to FIG. 16, but the following description may be equally applied to other camera modules (that is, the first camera module 2100*a* to the third camera module 2100*c*) according to an embodiment.

Referring to FIG. 16, the second camera module 2100*b* may include a prism 2105, an optical path folding element (hereinafter, "OPFE") 2110, an actuator 2130, an image sensing device 2140, and a storage 2150.

The prism 2105 may include a reflective surface 2107 of a light reflecting material to modify the path of light L incident from the outside.

According to an embodiment, the prism 2105 may change the path of light L incident in the first direction X to the second direction Y perpendicular to the first direction X. Also, the prism 2105 may rotate the reflective surface 2107 of the light reflecting material in an A direction or a B direction around a center axis 2106, thereby changing the path of the light L incident in the first direction X to the second direction Y perpendicular to the first direction X. At this time, the OPFE 2110 may also move in a third direction Z perpendicular to the first direction X and second direction Y.

For example, the OPFE 2110 may include optical lenses including m (where m is a natural number) groups. The m lenses may move in the second direction Y and change the optical zoom ratio of the camera module 2100*b*. For example, when the basic optical zoom ratio of the camera module 2100*b* is Z and the m optical lenses included in the OPFE 2110 are moved, the optical zoom ratio of the camera module 2100*b* may be changed to 3Z, 5Z, or an optical zoom ratio higher than 5Z.

The actuator 2130 may move the OPFE 2110 or optical lenses (hereinafter referred to as an optical lens) to a particular position. For example, the actuator 2130 may adjust the position of the optical lens, such that the image sensor 2142 is positioned at the focal length of the optical lens for accurate sensing.

The image sensing device 2140 may include an image sensor 2142, a logic 2144, an encoder 2145, and a memory 2146. The image sensor 2142 may sense an image of a target using light L provided through an optical lens. Functions of the image sensor 2142 of FIG. 16 may be similar to that of the image sensor 110 of FIG. 1, the image sensor 110a of FIG. 10, or the image sensor 110b of FIG. 13, and thus, redundant descriptions thereof will be omitted. The logic 2144 may control the overall operation of the second camera module 2100b.

The encoder 2145 may encode sensed image data. The encoder 2145 of FIG. 16 may perform functions similar to that of the encoder 120 of FIG. 1, the encoder 120a of FIG. 10, or the encoder 250b of FIG. 13, and thus, redundant descriptions will be omitted. In FIG. 16, the encoder 2145 is illustrated to be included in the logic 2144, but is not limited thereto, and may be implemented as an individual functional unit different from the logic 2144.

The memory 2146 may store information necessary for the operation of the second camera module 2100b such as calibration data 2147. The calibration data 2147 may include information necessary for the second camera module 2100b to generate image data by using the light L provided from the outside. The calibration data 2147 may include, for example, information about a degree of rotation described above, information about a focal length, information about an optical axis, etc. When the second camera module 2100b is implemented in the form of a multi-state camera in which the focal length is changed depending on the position of the optical lens, the calibration data 2147 may include focal distance values for respective positions (or states) of the optical lens and information related to auto focusing.

The storage 2150 may store image data sensed by the image sensor 2142. In some embodiments, the storage 2150 may storage compressed data generated by the encoder 2145. The storage 2150 may be arranged outside the image sensing device 2140, and may be implemented in a stacked form with a sensor chip forming the image sensing device 2140. In some embodiments, the storage 2150 may be implemented as an Electrically Erasable Programmable Read-Only Memory (EEPROM), but the inventive concept is not limited thereto.

Referring to FIGS. 15 and 16, in some embodiments, each of the first camera module 2100a, the second camera module 2100b and the third camera module 2100c may include the actuator 2130 (also collectively referred to as "the camera modules 2100a, 2100b and 2100c"). Accordingly, each of the camera modules 2100a, 2100b, and 2100c may include calibration data 2147, wherein the calibration data 2147 of the camera modules 2100a, 2100b, and 2100c are the same or different from each other according to an operation of the actuator 2130 included in each of the camera modules 2100a, 2100b, and 2100c.

In an example embodiment, one camera module (e.g., the second camera module 2100b) from among the camera modules 2100a, 2100b, and 2100c may be a folded lens type camera module including the prism 2105 and the OPFE 2110 as described above, and the other camera modules (e.g., the first camera module 2100a and the third camera module 2100c) may be vertical type camera module without the prism 2105 and the OPFE 2110. However, the one or more embodiments are not limited thereto.

In an embodiment, one camera module (e.g., a third camera module 2100c) from among the camera modules 2100a, 2100b, and 2100c may be a vertical type depth camera that extracts depth information by using an infrared ray (IR), for example. In this case, the AP 2200 may generate a 3D depth image by merging image data provided from such a depth camera with image data provided from another camera module (e.g., the first camera module 2100a or the second camera module 2100b).

In an embodiment, at least two camera modules (e.g., first camera module 2100a and second camera module 2100b) from among the camera modules 2100a, 2100b, and 2100c may have different field of views (FOVs). In this case, for example, at least two camera modules (e.g., the first camera module 2100a and the second camera module 2100b) from among the camera modules 2100a, 2100b, and 2100c may have different optical lenses, but the inventive concept is not limited thereto. For example, the first camera module 2100a from among the camera modules 2100a, 2100b, and 2100c may have a smaller FOV than the second camera module 2100b and the third camera module 2100c.

In some embodiments, the camera modules 2100a, 2100b, and 2100c may be different FOVs from one another. In this case, optical lenses included in the camera modules 2100a, 2100b, and 2100c may also be different from one another, but the inventive concept is not limited thereto.

In some embodiments, the camera modules 2100a, 2100b, and 2100c may be physically separated from one another. In other words, the camera modules 2100a, 2100b, and 2100c may not divide and use the sensing area of one image sensor 2142. Rather, an independent image sensor 2142 may be provided inside each of the camera modules 2100a, 2100b, and 2100c.

The AP 2200 may include a plurality of sub-processors (e.g., a first sub-processor 2210a, a second sub-processor 2210b and a third sub-processor 2210c), an image generator 2220, a camera module controller 2230, a memory controller 2240, and an internal memory 2250. The AP 2200 may be implemented separately from the camera modules 2100a, 2100b, and 2100c. For example, the AP 2200 and the camera modules 2100a, 2100b, and 2100c may be implemented separately from each other as separate semiconductor chips.

Image data or compressed data generated by the first to third camera module 2100a, 2100b, and 2100c may be respectively provided to the corresponding sub-processors 2210a, 2210b, and 2210c through first to third image signal lines ISLa, ISLb, and ISLc separated from one another. For example, first image data generated from the first camera module 2100a may be provided to the first sub-processor 2210a through a first image signal line ISLa, second image data generated from the second camera module 2100b may be provided to the second sub-processor 2210b through the second image signal line ISLb, and third image data generated from the third camera module 2100c may be provided to the third sub-processor 2210c through the third image signal line ISLc. The transmission of image data may be performed by using a camera serial interface based on the MIPI, but embodiments are not limited thereto.

In an embodiment, one sub-processor may be provided to process image data output from a plurality of camera modules. For example, the first sub-processor 2210a and the third sub-processor 2210c may be integrally implemented as a single sub-processor instead of being implemented separate from each other, and image data provided from the first camera module 2100a and the third camera module 2100c may be selected by a selecting element (e.g., a multiplexer) and provided to an integrated sub-image processor.

Each of the first to third sub-processors 2210a, 2210b, and 2210c may include the decoder 230 of FIG. 1, the decoder 230a of FIG. 10, or the decoder 230b of FIG. 13. The first to third sub-processors 2210a, 2210b, and 2210c may decompress the received compressed data to generate decompressed data, and output the generated decompressed data to the image generator 2220. The image generator 2220 may correspond to the ISP 240 of FIG. 1, the ISP 240a of FIG. 10, or the ISP 240b of FIG. 13.

The camera module controller 2230 may provide a control signal to each of the camera modules 2100a, 2100b, and 2100c. A control signal generated from the camera module controller 2230 may be provided to the corresponding camera modules 2100a, 2100b, and 2100c through control signal lines CSLa, CSLb, and CSLc separated from one another.

While the inventive concept has been particularly shown and described with reference to the embodiments described above, it will be understood that various changes in form and details may be made therein without departing from the spirit and scope of the disclosure defined in the following claims.

What is claimed is:

1. An image compression method of compressing each of a plurality of pixel groups forming image data, the method comprising:
   detecting a bad pixel among a plurality of pixels in a pixel group;
   generating a flag indicating position information about the bad pixel;
   calculating a first difference between a pixel value of a pixel among the plurality of pixels excluding the bad pixel and a reference pixel value; and
   generating a bitstream including the flag and the first difference.

2. The image compression method of claim 1, wherein the detecting the bad pixel comprises:
   determining whether a target pixel is the bad pixel based on at least one of pixel values of the plurality of pixels in the pixel group and at least one pixel value of at least one pixel adjacent to the pixel group.

3. The image compression method of claim 2, wherein the determining whether the target pixel is the bad pixel comprises:
   calculating an average pixel value of one or more pixels adjacent to the target pixel in the pixel group; and
   calculating a second difference between the average pixel value and a pixel value of the target pixel.

4. The image compression method of claim 1, further comprising determining the reference pixel value based on reference information including pixel values of pixels compressed prior to the pixel group.

5. The image compression method of claim 4, wherein the determining the reference pixel value comprises:
   determining the reference pixel value based on a pixel value of at least one pixel adjacent to the pixel group in the reference information.

6. The image compression method of claim 4, further comprising:
   updating the reference information based on pixel values of the plurality of pixels in the pixel group after the generating the bitstream.

7. The image compression method of claim 6, wherein the updating the reference information comprises:
   correcting a pixel value of the bad pixel in the pixel group; and
   updating the pixel values of the pixels other than the bad pixel in the pixel group and the corrected pixel value of the bad pixel in the reference information.

8. The image compression method of claim 7, wherein the correcting the pixel value of the bad pixel in the pixel group further comprises correcting the pixel value of the bad pixel based on a pixel value of at least one pixel adjacent to the bad pixel.

9. The image compression method of claim 1, further comprising generating compression information indicating a compression method applied to the pixel group,
   wherein the generating of the bitstream comprises generating the bitstream including the compression information.

10. A camera module comprising:
    an image sensor configured to generate image data comprising a plurality of pixels;
    an encoder configured to divide the plurality of pixels into a plurality of pixel groups, and sequentially compress the plurality of pixel groups to generate compressed data comprising a plurality of bitstreams; and
    a memory storing reference information comprising pixel values of pixels compressed by the encoder,
    wherein the encoder is further configured to:
    detect a bad pixel in a first pixel group;
    generate a first bitstream corresponding to the first pixel group by compressing first pixel values of a plurality of first pixels in the first pixel group based on a result of detecting the bad pixel and the reference information; and
    update the reference information based on a corrected pixel value obtained by correcting a pixel value of the bad pixel.

11. The camera module of claim 10, wherein the encoder is further configured to:
    correct the pixel value of the bad pixel based on a pixel value of at least one pixel adjacent to the bad pixel; and
    update the reference information by adding, to the reference information, pixel values of one or more first pixels other than the bad pixel among the plurality of first pixels and the corrected pixel value of the bad pixel.

12. The camera module of claim 11, wherein the encoder is further configured to:
    detect the bad pixel based on at least one of pixel value of the plurality of first pixels and pixels adjacent to a target pixel in the plurality of first pixels.

13. The camera module of claim 11, wherein the encoder is further configured to:
    determine a reference pixel value based on at least one pixel adjacent to the plurality of first pixels in the reference information;
    calculate a difference between a pixel value of a pixel among the plurality of first pixels other than the bad pixel and the reference pixel value; and
    generate the first bitstream including the difference.

14. The camera module of claim 13, wherein the encoder is further configured to:
    generate a flag indicating position information about the bad pixel and generate the first bitstream including the flag.

15. The camera module of claim 14, wherein the encoder further comprises a mode switch configured to generate a plurality of pieces of compressed data by compressing the image data multiple times according to a plurality of modes corresponding to a plurality of compression methods, and select one of the plurality of modes having fewest errors in the image data based on the plurality of pieces of compressed data.

16. The camera module of claim 15, wherein the encoder is further configured to:
generate compression information including information about the one of the plurality of modes that is selected and generate the first bitstream including the generated compression information.

17. An image processing system comprising:
an image sensor configured to generate image data comprising a plurality of pixels;
an encoder configured to generate a plurality of bitstreams by sequentially compressing a plurality of pixel groups in the image data; and
a decoder configured to restore the image data by decompressing the plurality of bitstreams,
wherein the encoder is further configured to:
detect a bad pixel in each of the plurality of pixel groups;
compress pixel values of a second pixel group among the plurality of pixel groups according to reference information, the reference information being generated based on pixel values of a first pixel group among the plurality of pixel groups that is compressed prior to the second pixel group; and
update the reference information based on a result of detecting the bad pixel.

18. The image processing system of claim 17, wherein the detecting of the bad pixel comprises:
detecting the bad pixel based on at least one pixel value of pixels included in the second pixel group and pixels adjacent to a target pixel of the second pixel group.

19. The image processing system of claim 18, wherein the compressing of the pixel values comprises:
generating a flag indicating position information about the bad pixel;
calculating a difference value between a pixel value of a pixel among the plurality of pixels other than the bad pixel in the second pixel group and a reference pixel value determined based on the reference information; and
generating a bitstream including the flag and the difference value.

20. The image processing system of claim 19, wherein the updating of the reference information comprises:
correcting a pixel value of the bad pixel based on the at least one pixel value of pixels adjacent to the bad pixel; and
updating the corrected pixel value of the bad pixel and the pixel values of the pixels other than the bad pixel to the reference information.

* * * * *